(12) United States Patent
Edwards et al.

(10) Patent No.: US 9,875,817 B2
(45) Date of Patent: Jan. 23, 2018

(54) NUCLEAR REACTOR SUPPORT AND SEISMIC RESTRAINT WITH IN-VESSEL CORE RETENTION COOLING FEATURES

(71) Applicant: Babcock & Wilcox mPower, Inc., Charlotte, NC (US)

(72) Inventors: Tyler A Edwards, Lynchburg, VA (US); Michael J Edwards, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 514 days.

(21) Appl. No.: 14/299,268

(22) Filed: Jun. 9, 2014

(65) Prior Publication Data

US 2015/0357054 A1    Dec. 10, 2015

(51) Int. Cl.
| | | |
|---|---|---|
| *G21C 13/024* | (2006.01) | |
| *G21C 5/10* | (2006.01) | |
| *G21C 9/016* | (2006.01) | |
| *G21C 15/18* | (2006.01) | |

(52) U.S. Cl.
CPC .............. *G21C 5/10* (2013.01); *G21C 9/016* (2013.01); *G21C 13/024* (2013.01); *G21C 15/18* (2013.01); *Y02E 30/40* (2013.01)

(58) Field of Classification Search
CPC ........ G21C 13/024; G21C 9/016; G21C 5/10; G21C 15/18
USPC ................... 376/280, 282, 289, 302
See application file for complete search history.

(56) References Cited

U.S. PATENT DOCUMENTS

| | | | | |
|---|---|---|---|---|
| 3,629,064 A | * | 12/1971 | Zivi ................. | G21C 9/016 376/280 |
| 3,795,139 A | * | 3/1974 | Peck ................. | G21C 13/024 376/285 |
| 3,929,566 A | * | 12/1975 | Noyes ............... | G21C 13/02 376/277 |
| 4,008,757 A | | 2/1977 | Weatherford | |
| 4,115,194 A | * | 9/1978 | Butti ................ | G21C 13/024 376/285 |
| 4,473,528 A | | 9/1984 | Kleimola | |
| 4,576,782 A | | 3/1986 | Loose | |
| 4,650,642 A | * | 3/1987 | Gluekler ............. | G21C 13/10 376/280 |
| 4,753,771 A | | 6/1988 | Conway et al. | |
| 4,793,964 A | * | 12/1988 | Fajeau .............. | G21C 1/322 376/282 |
| 4,986,956 A | | 1/1991 | Garabedian | |

(Continued)

FOREIGN PATENT DOCUMENTS

| | | | | |
|---|---|---|---|---|
| EP | 2096644 | | 9/2009 | |
| WO | WO 2015/102742 | * | 7/2015 | ........... G21C 13/024 |

OTHER PUBLICATIONS

International Search Report and Written Opinion dated Nov. 13, 2015 for PCT/US15/34659.

*Primary Examiner* — Jack W Keith
*Assistant Examiner* — Daniel Wasil
(74) *Attorney, Agent, or Firm* — Nelson Mullins Riley & Scarborough, LLP

(57) ABSTRACT

A nuclear reactor including a lateral seismic restraint with a vertically oriented pin attached to the lower vessel head and a mating pin socket attached to the floor. Thermally insulating materials are disposed alongside the exterior surface of a lower portion of the reactor pressure vessel including at least the lower vessel head.

11 Claims, 16 Drawing Sheets

(56) References Cited

U.S. PATENT DOCUMENTS

| | | | |
|---|---|---|---|
| 5,049,353 A | | 9/1991 | Conway et al. |
| 5,106,571 A | | 4/1992 | Wade et al. |
| 5,202,083 A | | 4/1993 | Spinks et al. |
| 5,268,943 A | | 12/1993 | Corletti et al. |
| 5,268,944 A | * | 12/1993 | Ekeroth ............... G21C 11/08 376/289 |
| 5,276,720 A | | 1/1994 | Oosterkamp et al. |
| 5,282,230 A | | 1/1994 | Billig et al. |
| 5,349,617 A | | 9/1994 | Gautier |
| 5,661,770 A | | 8/1997 | Spinks |
| 5,694,442 A | | 12/1997 | Cinotti et al. |
| 5,699,394 A | | 12/1997 | Schreiber et al. |
| 5,887,043 A | | 3/1999 | Spinks |
| 5,907,588 A | * | 5/1999 | Fischer ............... G21C 9/016 376/280 |
| 7,154,982 B2 | | 12/2006 | Gautier et al. |
| 8,170,173 B2 | | 5/2012 | Reyes, Jr. et al. |
| 2008/0198960 A1 | * | 8/2008 | Keegan ............... G21C 15/18 376/289 |
| 2009/0116607 A1 | * | 5/2009 | Song ............... G21C 9/016 376/280 |
| 2009/0129530 A1 | | 5/2009 | Reyes, Jr. et al. |
| 2009/0129531 A1 | | 5/2009 | Reyes, Jr. et al. |
| 2010/0278294 A1 | | 11/2010 | Kwon et al. |
| 2012/0177168 A1 | | 7/2012 | Reyes, Jr. et al. |
| 2012/0207260 A1 | | 8/2012 | Houghton et al. |
| 2012/0294408 A1 | | 11/2012 | Reyes, Jr. et al. |
| 2013/0114778 A1 | | 5/2013 | Horie et al. |
| 2013/0336440 A1 | | 12/2013 | Memmott et al. |
| 2013/0336441 A1 | | 12/2013 | Cronje et al. |
| 2014/0016734 A1 | | 1/2014 | Moon et al. |
| 2014/0050292 A1 | | 2/2014 | Kim et al. |

* cited by examiner

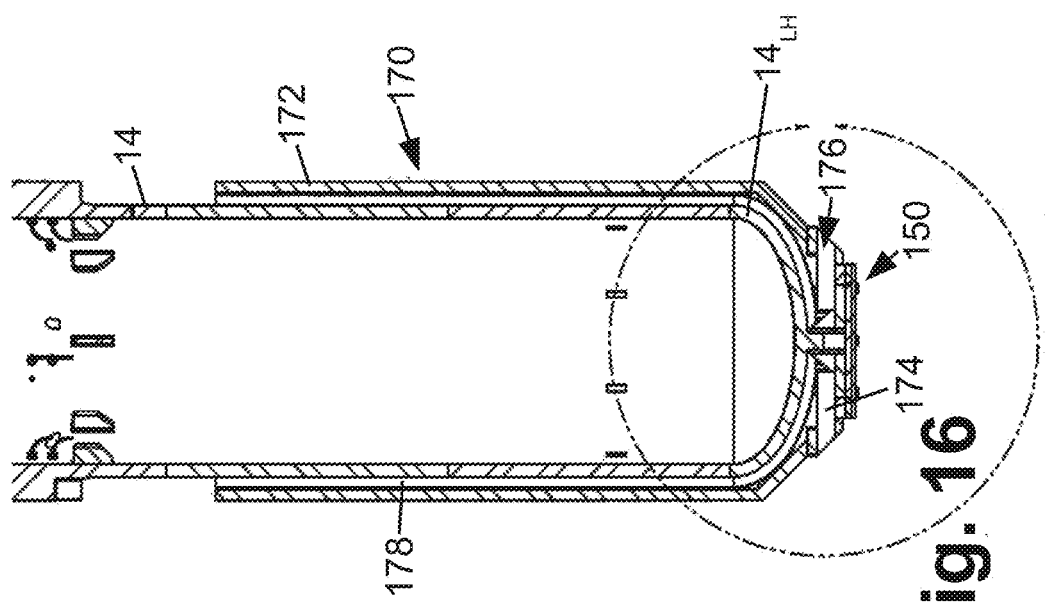
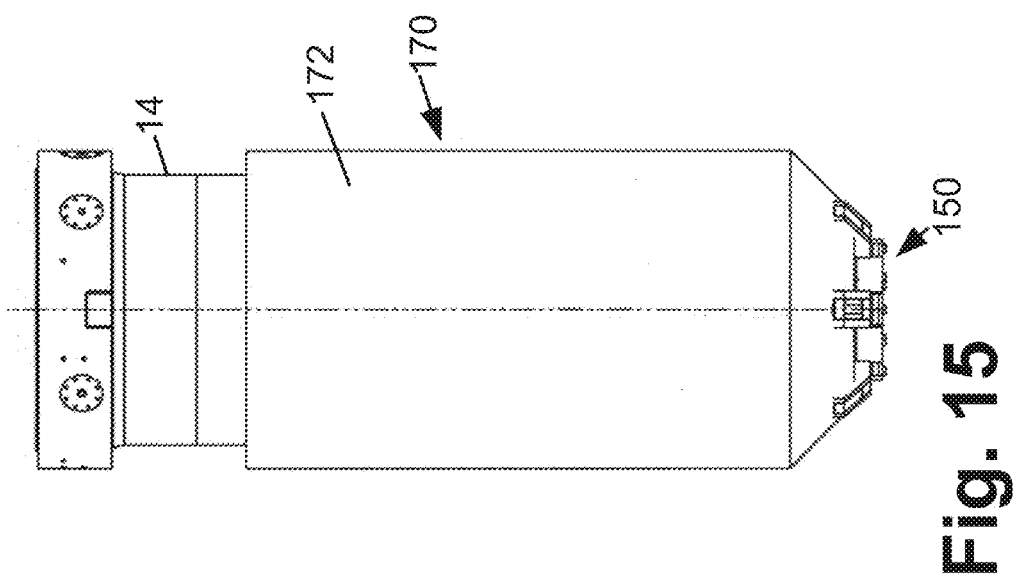

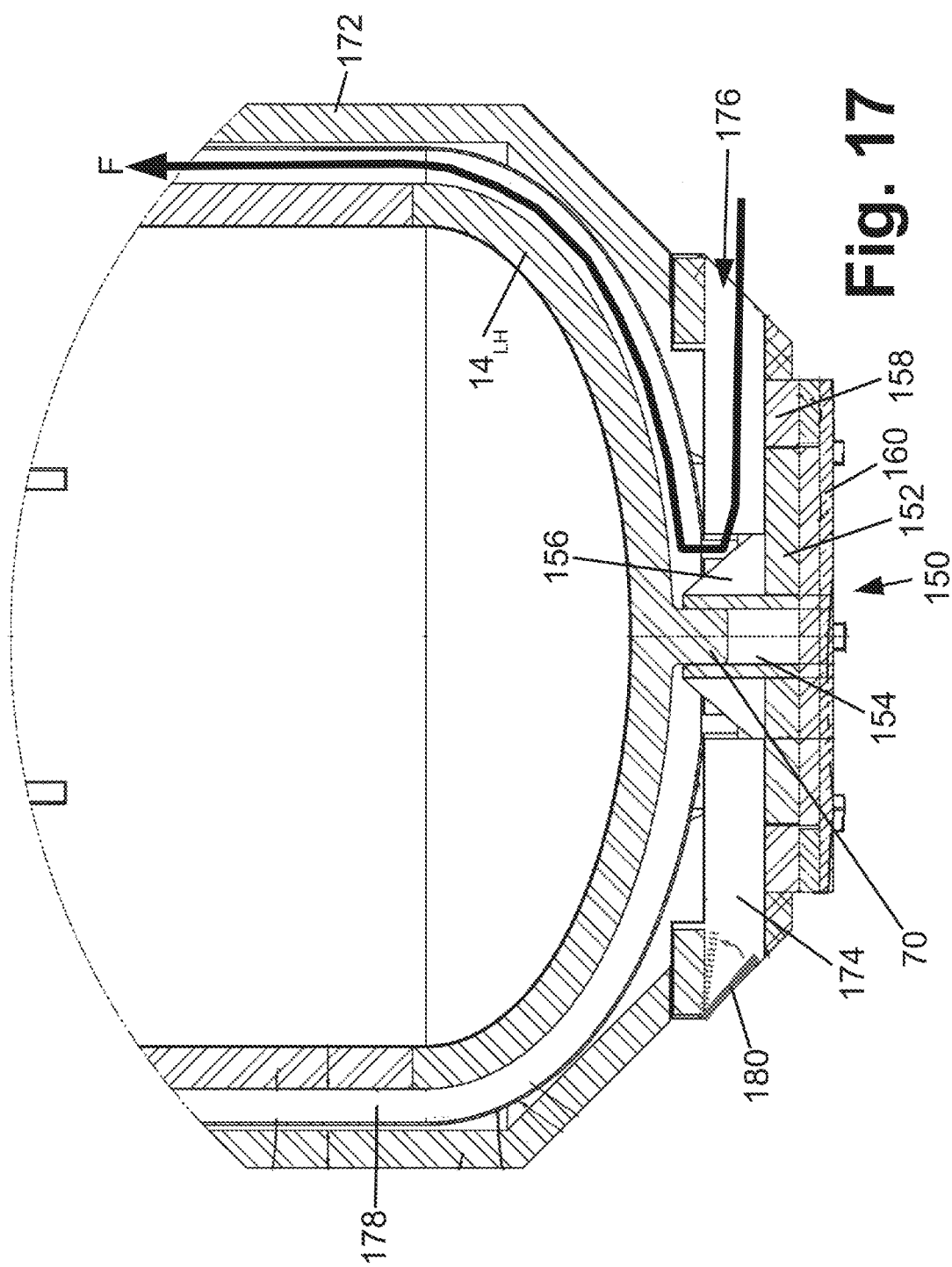

NUCLEAR REACTOR SUPPORT AND SEISMIC RESTRAINT WITH IN-VESSEL CORE RETENTION COOLING FEATURES

This invention was made with Government support under Contract No. DE-NE0000583 awarded by the Department of Energy. The Government has certain rights in this invention.

BACKGROUND

The following pertains to the nuclear reactor arts, nuclear power arts, nuclear reactor safety arts, and related arts.

Existing nuclear power plants are typically light water thermal nuclear reactors of the boiling water reactor (BWR) or pressurized water reactor (PWR) designs. In such a reactor, a nuclear reactor core comprising fissile material (typically a uranium compound such as $UO_2$ enriched in fissile $^{235}U$) is disposed in coolant (purified water) contained at an operational pressure and temperature in a reactor pressure vessel. A nuclear chain reaction involving fission of the fissile $^{235}U$ generates heat in the nuclear reactor core which is transferred to the coolant. In a BWR design, the heat directly converts coolant to steam, and steam separator/dryer hardware contained in the reactor pressure vessel generates steam that is output via large-diameter piping to a turbine to generate electricity (in a nuclear power plant setting; more generally the output steam is used to perform other useful work). The condensed coolant from the turbine is fed back into the BWR pressure vessel via additional large-diameter piping. In a PWR design, the primary coolant remains in a liquid state (e.g. subcooled) and is piped via large-diameter piping to an external steam generator where heat from the (primary) reactor coolant converts (separate secondary) coolant to steam that in turn drives the turbine. The condensed coolant from the steam generator is fed back into the PWR pressure vessel via additional large-diameter piping.

In such designs, the reactor pressure vessel is relatively compact. It contains the reactor core and associated internals such as control rods, and (in the case of a BWR) the steam separator/dryer hardware, along with attached ancillary equipment such as control rod drive systems and valves. The nuclear reactor core is typically the heaviest component and it is located in the lower portion of the reactor pressure vessel so as to reduce likelihood of the core being uncovered in the event of a loss of coolant accident (LOCA). The large-diameter piping connecting the reactor pressure vessel with the coolant loop to the turbine (for a BWR) or steam generator (for a PWR) also provides structural support for the compact reactor pressure vessel.

BRIEF SUMMARY

In some embodiments described herein as illustrative examples, a nuclear island comprises: a nuclear reactor including a nuclear reactor core comprising fissile material disposed in a reactor pressure vessel; a vertically oriented pin attached to the bottom of a lower vessel head of the reactor pressure vessel; a pin socket disposed on a floor underneath the nuclear reactor and receiving the vertically oriented pin; and thermal insulation jacketing the lower portion of the reactor pressure vessel including the lower vessel head. In some embodiments the vertically oriented pin defines a vertical axis that intersects the center of gravity of the nuclear reactor. In some embodiments the vertically oriented pin comprises a circular cylindrical pin.

In some embodiments, the nuclear island of the immediately preceding paragraph further comprises a support base including the pin socket. The support base is disposed on the floor underneath the nuclear reactor and is configured to be laterally immobilized. In some such embodiments, one or more abutment elements are secured to the floor underneath the nuclear reactor, and one or more peripheral surfaces of the support base engage the one or more abutment elements secured to the floor underneath the nuclear reactor to laterally immobilize the support base. The abutment elements may comprise walls of a reactor cavity that contains a lower portion of the nuclear reactor including at least the nuclear reactor core and the lower vessel head. In some embodiments, the support base includes radial beams extending radially outward from the pin socket and the one or more peripheral surfaces of the support base that engage the one or more abutment elements secured to the floor underneath the nuclear reactor comprise outboard ends of the radial beams. In some embodiments the support base includes a socket plate on which the pin socket is attached, and the one or more peripheral surfaces of the support base that engage the one or more abutment elements secured to the floor underneath the nuclear reactor comprises an outer perimeter of the socket plate. In some embodiments employing such a socket plate, the one or more abutment elements secured to the floor underneath the nuclear reactor may comprise a retaining ring plate secured to the floor underneath the nuclear reactor and having an inside perimeter that comports with the outer perimeter of the socket plate. In some embodiments employing a socket plate, the outer perimeter of the socket plate is a polygonal outer perimeter that further includes tabs extending from the sides of the polygonal outer perimeter that mate into recesses of the one or more abutment elements secured to the floor underneath the nuclear reactor. Gaps between the tabs and the recesses in the radial direction are larger than gaps between the tabs and the recesses on the sides of the tabs.

In some nuclear island embodiments as described in the two immediately preceding paragraphs, the thermal insulation jacketing the lower portion of the reactor pressure vessel including the lower vessel head comprises a cylindrical jacket comprising thermal insulation that surrounds the lower portion of the pressure vessel including the lower vessel head, wherein the cylindrical jacket narrows toward the vertically oriented pin attached to the bottom of the lower vessel head of the reactor pressure vessel. In some such embodiments, a cylindrical plenum is defined between the outside surface of the reactor pressure vessel and the inside surface of the cylindrical jacket, the cylindrical plenum having a lower inlet defined by the narrowing of the cylindrical jacket toward the vertically oriented pin attached to the bottom of the lower vessel head of the reactor pressure vessel. Optionally, ducts may be configured to admit water into the lower inlet of the cylindrical plenum.

In some embodiments described herein as illustrative examples, a nuclear island comprises: a nuclear reactor including a nuclear reactor core comprising fissile material disposed in a reactor pressure vessel; a floor connection extending between the bottom of a lower vessel head of the reactor pressure vessel and a floor underneath the nuclear reactor; and an in-vessel reactor core retention cooling system comprising one or more baffles defining a plenum between the baffles and the exterior surface of a lower portion of the reactor pressure vessel including at least the lower vessel head, the plenum narrowing toward the floor connection to define a lower inlet that surrounds the floor connection. The one or more baffles may include thermally insulating material, such as by way of illustrative example a thermally reflective metal multi-foil.

In some embodiments of a nuclear island as set forth in the immediately preceding paragraph, the floor connection includes a vertically oriented pin attached to one of the bottom of the lower vessel head and the floor underneath the nuclear reactor, and a pin socket attached to the other of the bottom of the lower vessel head and the floor underneath the nuclear reactor that receives the vertically oriented pin. The nuclear island may further comprise a support base secured to the floor underneath the nuclear reactor, with the support base including the vertically oriented pin or pin socket attached to the floor underneath the nuclear reactor. In such embodiments, the one or more baffles may include one or more baffles mounted onto the support base and defining a plenum between the one or more baffles mounted onto the support base and the exterior surface of the lower vessel head.

In some embodiments described herein as illustrative examples, a nuclear island comprises a nuclear reactor, a lateral seismic restraint, and an in-vessel reactor core retention cooling system. The nuclear reactor suitably includes a nuclear reactor core comprising fissile material disposed in a reactor pressure vessel having a lower vessel head disposed below the nuclear reactor core. The lateral seismic restraint suitably includes a vertically oriented pin attached to one of the bottom of the lower vessel head and a floor underneath the nuclear reactor, and a mating pin socket attached to the other of the bottom of the lower vessel head and the floor underneath the nuclear reactor. The in-vessel reactor core retention cooling system suitably includes one or more baffles disposed alongside the exterior surface of a lower portion of the reactor pressure vessel including at least the lower vessel head, with a plenum defined between the one or more baffles and the exterior surface of a lower portion of the reactor pressure vessel. In some embodiments the one or more baffles define a lower inlet surrounding the lateral seismic restraint and in fluid communication with the plenum defined between the one or more baffles and the exterior surface of the lower portion of the reactor pressure vessel. The nuclear island may further comprise a support base secured to the floor underneath the nuclear reactor, wherein the vertically oriented pin or mating pin socket is attached to the floor via the support base. The one or more baffles may in some embodiments include a cylindrical jacket surrounding the lower portion of the pressure vessel including the lower vessel head, the cylindrical jacket having a narrowed lower end defining a central plenum inlet containing the lateral seismic restraint. In such embodiments, the in-vessel reactor core retention cooling system may further comprise radial ducts configured to admit water into the lower plenum inlet. In some embodiments the one or more baffles include thermally insulating material.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

FIG. 3 shows the lower vessel flange raised slightly above its installed position in which it rests on the three support engagement surfaces.

FIGS. 15 and 16 diagrammatically show a side view and a side sectional view, respectively, of an in-vessel core retention cooling system including the components shown in FIG. 14.

FIG. 17 diagrammatically shows an enlarged side sectional view of the bottom portion of the in-vessel core retention cooling system of FIGS. 15 and 16, where the enlarged bottom portion is delineated by a circle in FIG. 16.

DETAILED DESCRIPTION OF THE PREFERRED EMBODIMENTS

Figure 1:
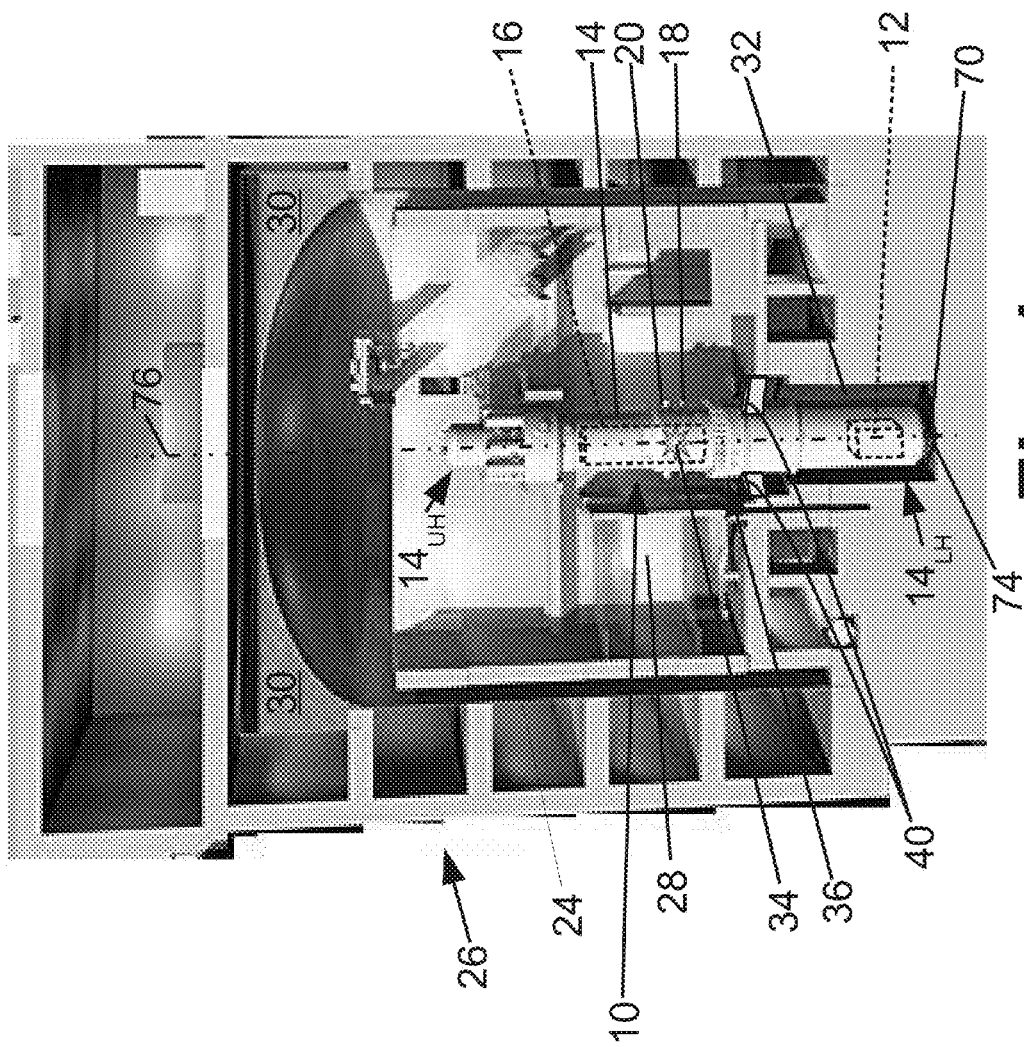
FIG. 1 diagrammatically shows a perspective view of an illustrative nuclear reactor island in partial cutaway to reveal internal components.

With reference to FIG. 1, an illustrative nuclear reactor island includes a nuclear reactor 10 comprising a nuclear reactor core 12 disposed in a reactor pressure vessel 14. It is to be understood that the reactor pressure vessel 14, which is typically a stainless steel or other metal vessel, is opaque such that the nuclear reactor core 12 is occluded by the reactor pressure vessel 14; accordingly, FIG. 1 shows the reactor core 12 diagrammatically in phantom, i.e. using dashed lines, to indicate it is actually hidden from view being disposed inside the reactor pressure vessel 14. Illustrative reactor pressure vessel 14 is of a typical design in which the reactor pressure vessel comprises a cylindrical main body (optionally with some deviation from a perfect mathematical cylindrical shape, for example to accommodate flanges or other vessel penetrations, small increases or decreases in cylinder diameter along the length of the cylinder, or so forth) with its cylinder axis oriented vertically, and further includes an upper vessel head $14_{UH}$ closing the top of the cylindrical main body and a lower vessel head $14_{LH}$ closing the bottom of the cylindrical main body. In such a design, the nuclear reactor core 12 is typically disposed near the bottom of the pressure vessel, that is, closer to the lower vessel head $14_{LH}$ than to the upper vessel head $14_{UH}$.

The illustrative nuclear reactor 10 is of the pressurized water reactor (PWR) variety, but differs from a conventional PWR in that the nuclear reactor 10 further includes an internal steam generator 16 disposed inside the reactor pressure vessel 14. (As with the core 12, the steam generator 16 is occluded from view by the pressure vessel 14 and according is drawn in phantom in FIG. 1). Such a PWR design in which the steam generator is located internally inside the pressure vessel is known in the art as an "integral PWR". During operation of the nuclear reactor 10, the reactor pressure vessel 14 contains coolant, and the nuclear reactor core 12 includes a fissile material. In the illustrative examples, the nuclear reactor 10 is a light water reactor employing a uranium composition such as uranium oxide ($UO_2$) enriched in the fissile $^{235}U$ isotope, and the coolant is purified water. However, other reactors are contemplated, such as a sodium-cooled nuclear reactor. During reactor operation, the nuclear reactor core 12 supports a nuclear fission chain reaction involving the fissile material (e.g. $^{235}U$), and the nuclear fission chain reaction generates heat in the core 12 that in turn heats the coolant in the reactor pressure vessel 14. The coolant serves as a heat transfer medium to transfer heat from the nuclear reactor core 12 to the internal steam generator 16. Feedwater (secondary coolant) flows into the steam generator 16 via a feedwater inlet vessel penetration 18, and steam (that is, secondary coolant converted to steam by heat from the primary coolant) exits the nuclear reactor 10 via a steam outlet vessel penetration 20. The piping connecting with the vessel penetrations 18, 20 is not illustrated, but is typically of relatively small diameter as compared with the piping of a primary coolant loop of a conventional PWR or of a BWR.

The nuclear reactor 10 is disposed inside a radiological containment 24, which is typically a steel or steel-reinforced concrete structure designed to contain any radiological release from the nuclear reactor 10, for example in the event of a loss of coolant accident (LOCA). In the illustrative nuclear island of FIG. 1, the radiological containment 24 is in turn located inside a reactor service building 26. Additional components may be located inside the radiological containment 24, such as an illustrative refueling water storage tank (RWST) 28. The illustrative nuclear island of FIG. 1 employs an ultimate heat sink (UHS) in the form of passive containment cooling tanks 30 located on a top dome of the radiological containment 24, but other UHS structures are contemplated, such as a cooling tower.

The floor of the radiological containment 24 includes a reactor cavity 32 inside of which is disposed the lower portion of the nuclear reactor 10 including the nuclear reactor core 12 and the lower portion of the reactor pressure vessel 14 which contains the core 12. However, bottom-supporting the nuclear reactor 10 in this position raises certain difficulties. Unlike a conventional PWR or BWR design, the nuclear reactor of illustrative FIG. 1 has a relatively high center-of-gravity 34 due to the presence of additional components, such as the steam generator 16, in the upper portion of the pressure vessel 14. Additionally, the integral PWR 10 does not have connected large-diameter piping for an external primary coolant loop, and hence does not benefit from the structural support provided by such large-diameter pipe connections. Another concern with bottom-supporting the nuclear reactor 10 in the reactor cavity 32 is that in the event of a LOCA or other event leading to the core 12 heating beyond its operational design limits, the bottom support may be compromised.

An alternative approach (not illustrated) for addressing these issues is to employ a top-supported configuration, e.g. suspending the nuclear reactor from above. However, a top-supported configuration has its own disadvantages. It complicates reactor refueling, because in the refueling process an upper head or other upper portion of the reactor pressure vessel is usually removed and fuel assemblies are unloaded and loaded from above via the open upper end. A top-supported configuration can also be susceptible to lateral movement of the nuclear reactor during a seismic event.

Figure 2:
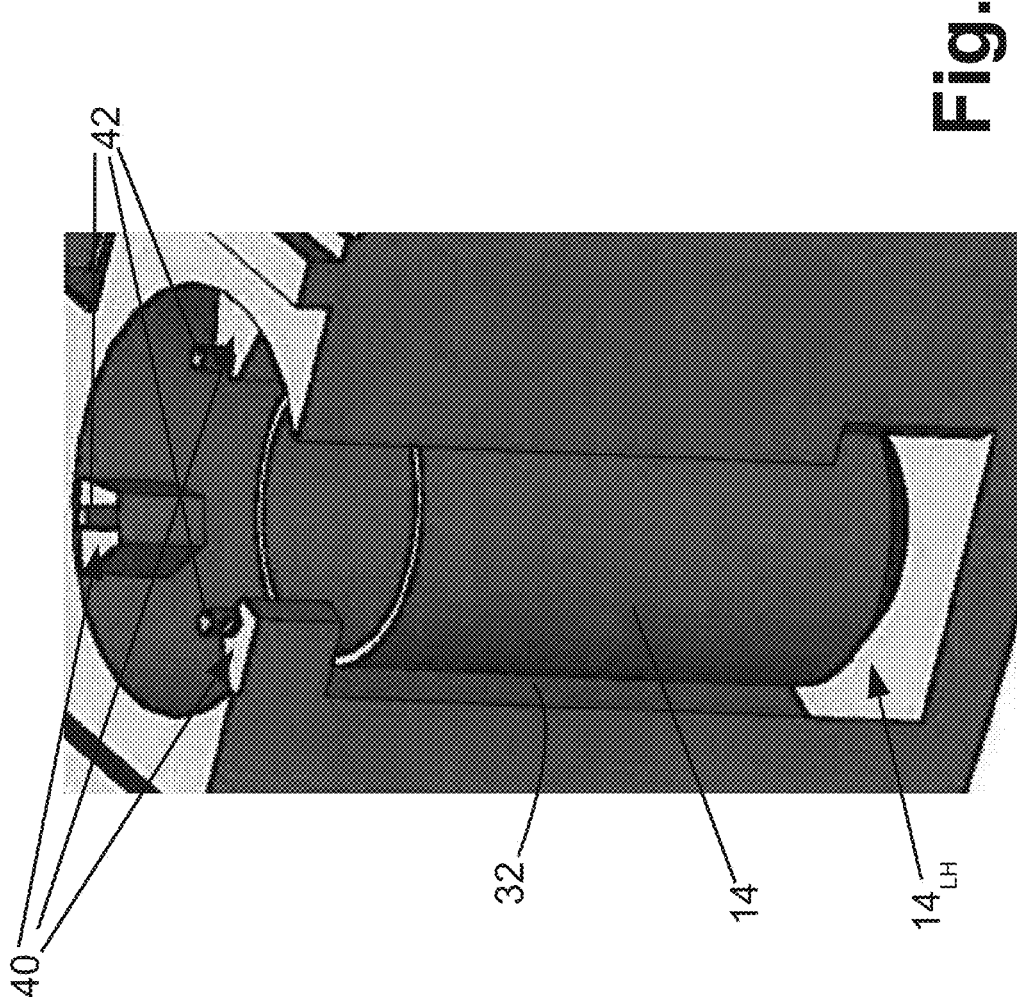
FIG. 2 diagrammatically shows a perspective view of the reactor cavity of FIG. 1 in partial cutaway along with the three support engagement surfaces built into the top of the reactor cavity.
Figure 3:
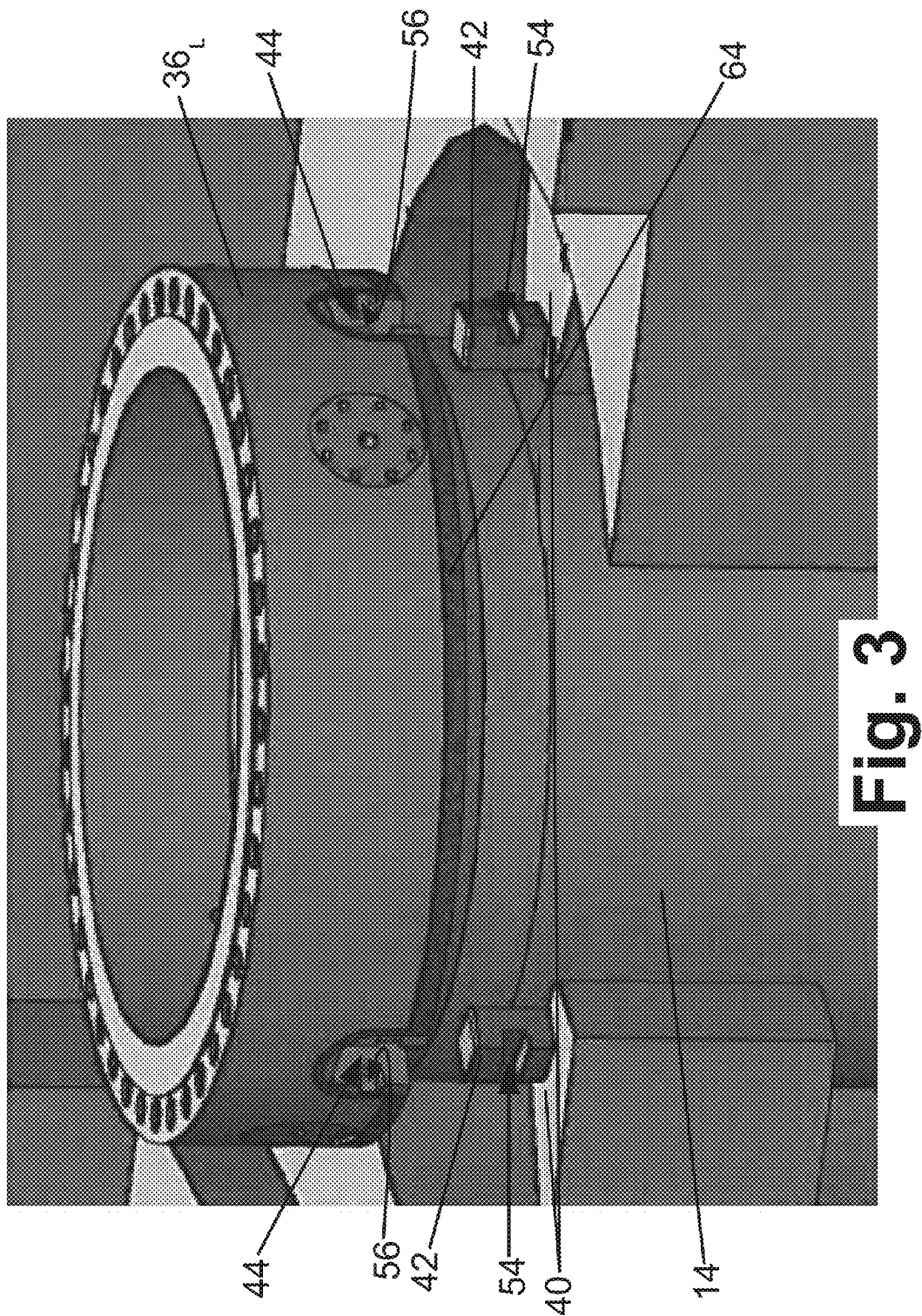
FIG. 3 diagrammatically shows a perspective view focusing on the lower vessel flange of the flange coupling of FIG. 1 and its engagement with the three support engagement surfaces built into the top of the reactor cavity.

In the illustrative example of FIG. 1, and with further reference to FIGS. 2 and 3, the nuclear reactor (and more particularly the reactor pressure vessel 14) is supported in suspended fashion at or near a flange coupling 36 of the reactor pressure vessel 14 by a set of three support engagement surfaces 40 built into or otherwise anchored to the top of the reactor cavity 32 or otherwise anchored to the civil structure of the radiological containment 24. The illustrative flange coupling 36 is located at around the mid-elevation of the pressure vessel 14. In the illustrative integral PWR design, during refueling the reactor pressure vessel 14 is opened at the flange coupling 36 and the upper portion of the pressure vessel 14 including the steam generator(s) 16 is lifted off to provide access to the nuclear reactor core 12. This is merely an illustrative design, and in other contemplated embodiments the flange coupling 36 may be located elsewhere, for example near the top of the pressure vessel so that an upper vessel head may be removed via the flange coupling to perform the refueling.

Regardless of the flange coupling location, the nuclear reactor 10 is preferably supported in suspended fashion at an elevation located below the center-of-gravity 34 of the nuclear reactor 10. In the illustrative example this support is via the three support engagement surfaces 40, which are preferably evenly spaced at 120° intervals around the reactor pressure vessel 14. (Note that in FIGS. 1 and 3, only two of the support engagement surfaces 40 are visible, while in the perspective view from an elevated vantage point shown in FIG. 2 all three support engagement surfaces 40 are visible. The illustrative support engagement surfaces 40 are narrow ledges that extend inboard from the perimeter of the reactor cavity 32.

The use of specifically three spaced-apart support engagement surfaces 40 has certain advantages. With this arrangement, it is ensured that each of the three spaced-apart support engagement surfaces 40 carries load of the reactor weight. Two (relatively narrow) support engagement surfaces is insufficient because the two support surfaces would define a linear axis about which the reactor could rotate, which is especially likely when the center of gravity is above the support elevation. On the other hand, with four or more spaced apart support engagement surfaces, there is a possibility that the weight of the reactor could shift off of one or more of the support engagement surfaces so that the remaining support engagement surfaces carry additional load. This is acceptable, but requires that the four or more support engagement surfaces be "over-designed" to accommodate the additional load. Using specifically three support engagement surfaces 40 spaced apart at 120° intervals around the nuclear reactor 10, as illustrated, defines a minimum support configuration off of which the weight of the reactor cannot readily shift. While a single continuous, e.g. annular, support surface could alternatively be employed, this would effectively close the top of the reactor cavity, which would impede flooding of the cavity during a LOCA response, and would also complicate reactor access for maintenance operations.

FIG. 2 shows a portion of the civil structure in partial cutaway including the reactor cavity 32 and the three support engagement surfaces 40, along with a lowermost portion of the reactor pressure vessel 14 with the upper portion including the flange coupling 36 cut away. As seen in FIG. 2, the illustrative support engagement surfaces 40 each include a lug 42.

FIG. 3 shows an enlarged view in partial cutaway of the top of the reactor cavity 32 and the three support engagement surfaces 40, along with the lower portion of the reactor pressure vessel 14 including a lower vessel flange 36$_L$ (which is part of the flange coupling 36). In illustrative FIG. 3 the lower portion of the reactor pressure vessel 14 is shown in a slightly elevated position, such as it might assume when being lowered into the reactor cavity 32 but before engaging the three support engagement surfaces 40. As seen in FIG. 3, lug cutouts 44 are located at the bottom outer region of the lower vessel flange 36$_L$. These lug cutouts 44 mate with the vertical lugs 42 located on the respective support engagement surfaces 40 of the civil structure of the radiological containment structure 24. When the lower portion of the reactor pressure vessel 14 is initially lowered into the containment, it is clocked (that is, arranged rotationally) so that the lug cutouts 44 in the lower vessel flange 36$_L$ slide down over the vertical lugs 42 of the respective support engagement surfaces 40. The lugs 42 do not bear the weight of the reactor vessel 14, but rather serve as seismic restraints. The weight of the reactor pressure vessel 10 is borne by the support engagement surfaces 40, and more particularly in the illustrative embodiment by the lower edge of the lower vessel flanges 36$_L$ resting on the upper surfaces of the support engagement surfaces 40. The lug cutouts 44 in the lower vessel flange 36$_L$ are arranged in a circular pattern around the perimeter of the lower vessel flange 36$_L$, spaced apart by 120° intervals, and are used to transfer the lateral seismic loads from the lower vessel flange 36$_L$ to the civil structure.

Figure 4:
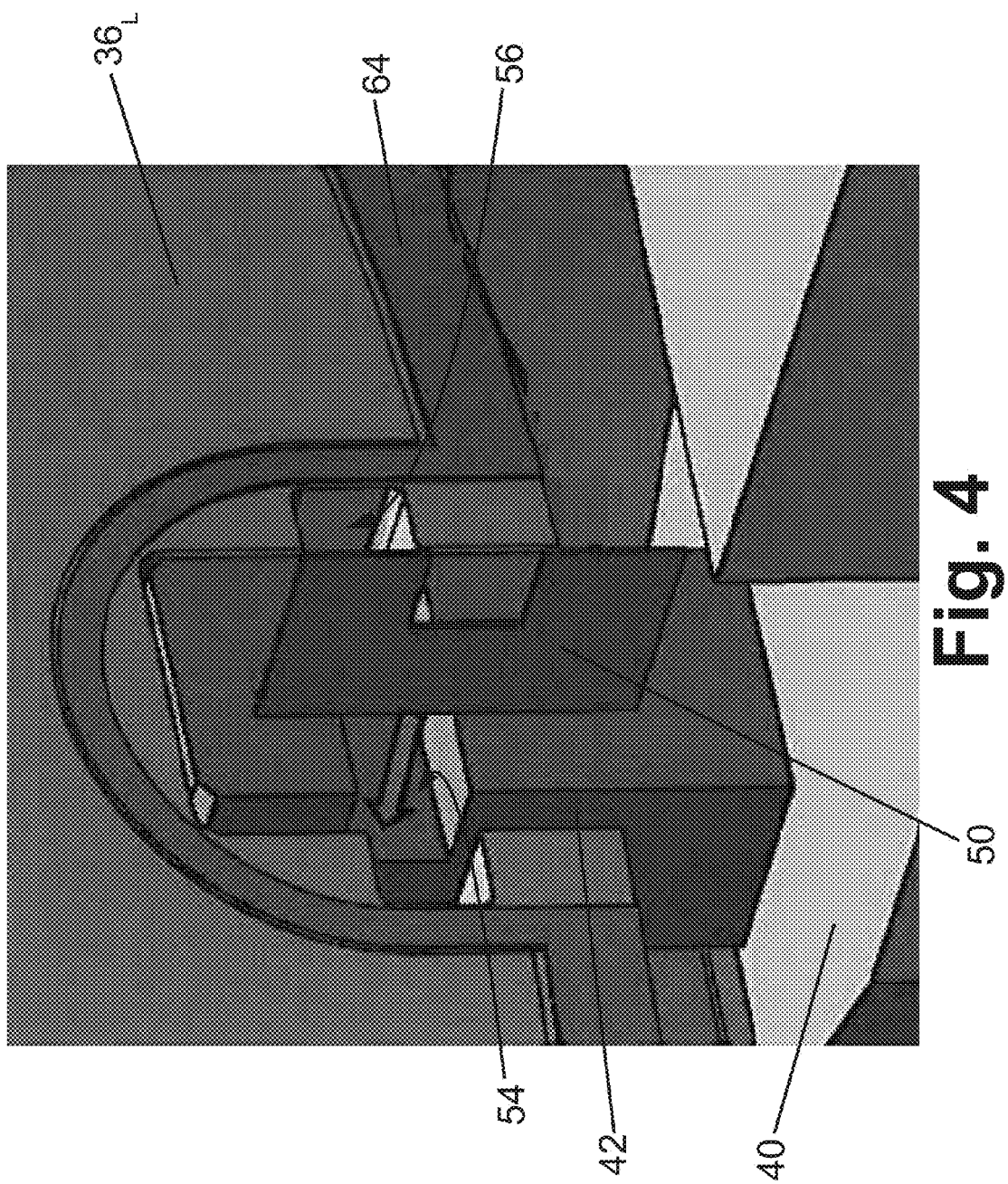
FIG. 4 diagrammatically shows a perspective view of a lug on one of the support engagement surfaces shown in FIG. 3, engaged with a lug cutout located at the bottom outer region of the lower vessel flange, and further showing installation of a shim for trimming a lateral gap in the lug/cutout engagement.

With reference to FIG. 4, the lugs 42 and lug cutouts 44 are preferably sized with gaps between the lateral edges to allow the reactor pressure vessel 14 to thermally grow radially and not contact the civil structure lugs 42. However, such gaps can adversely impact compliance with applicable nuclear regulations regarding seismic support. In some such regulations, a gap of ⅟₁₆-inch or less is required to allow for the seismic analysis to consider the interface between the two elements 42, 44 to be in direct contact. To achieve this, as shown in FIG. 4, the gaps are optionally closed (at least partially) by placing shims 50 into these gaps that reduce the gaps less than ⅟₁₆-inch (or another target gap size). The remaining gap of ⅟₁₆-inch or less allows for the reactor pressure vessel 14 to move to accommodate radial thermal expansion and contraction, or vessel rotation, without creating friction and wear points on the shims 50. The lugs 42 and mating lug cutouts 44 thus define a seismic rotational restraint assembly that allows the reactor pressure vessel 14 to thermally expand or contract radially, but prevents rotational of the pressure vessel 14 during a seismic event.

Figure 5:
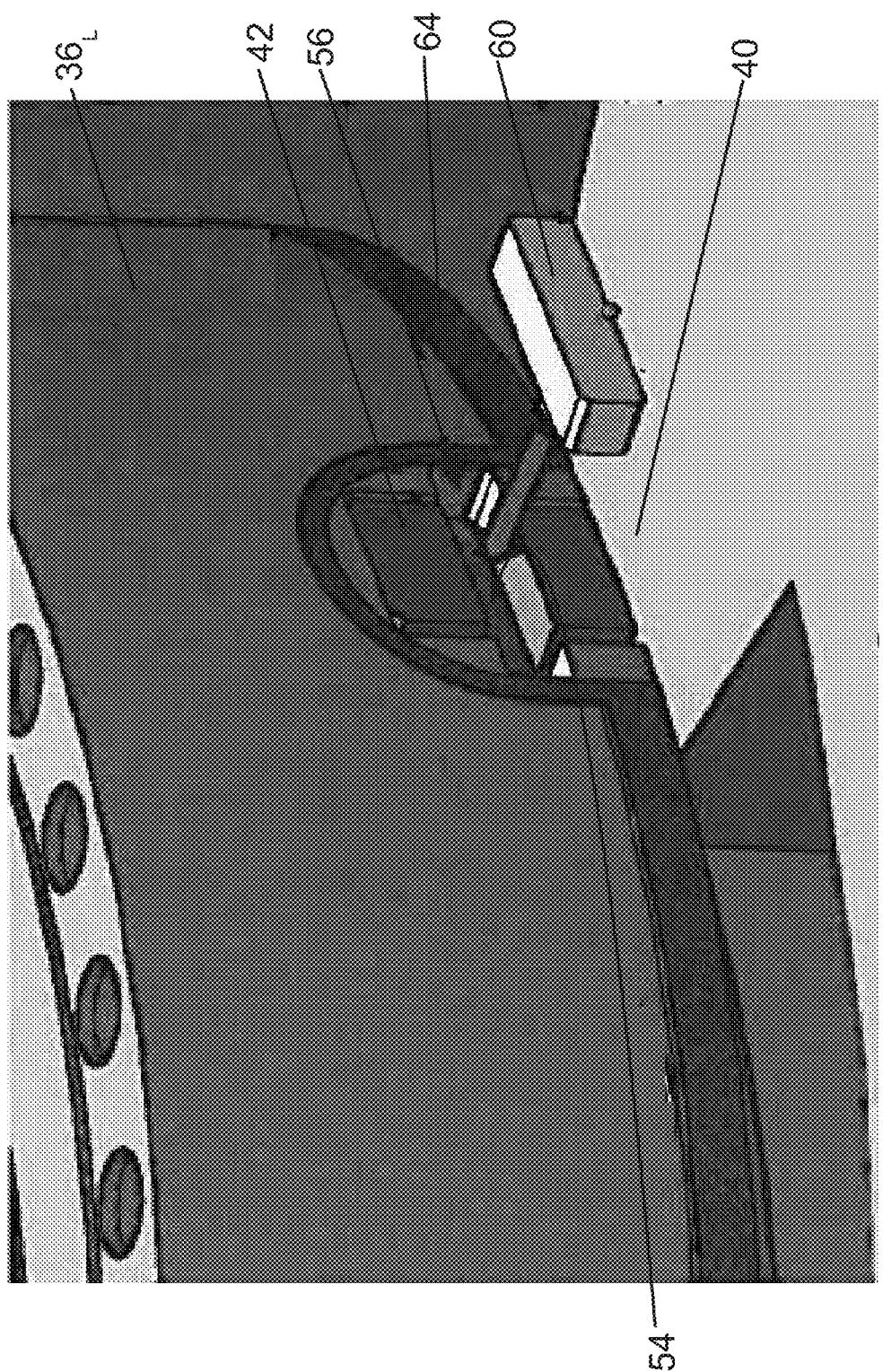
FIG. 5 diagrammatically shows a perspective view of a lug on one of the support engagement surfaces shown in FIG. 3, engaged with a lug cutout located at the bottom outer region of the lower vessel flange, and further showing a locking block being inserted into a lug slot of the lug.
Figure 6:
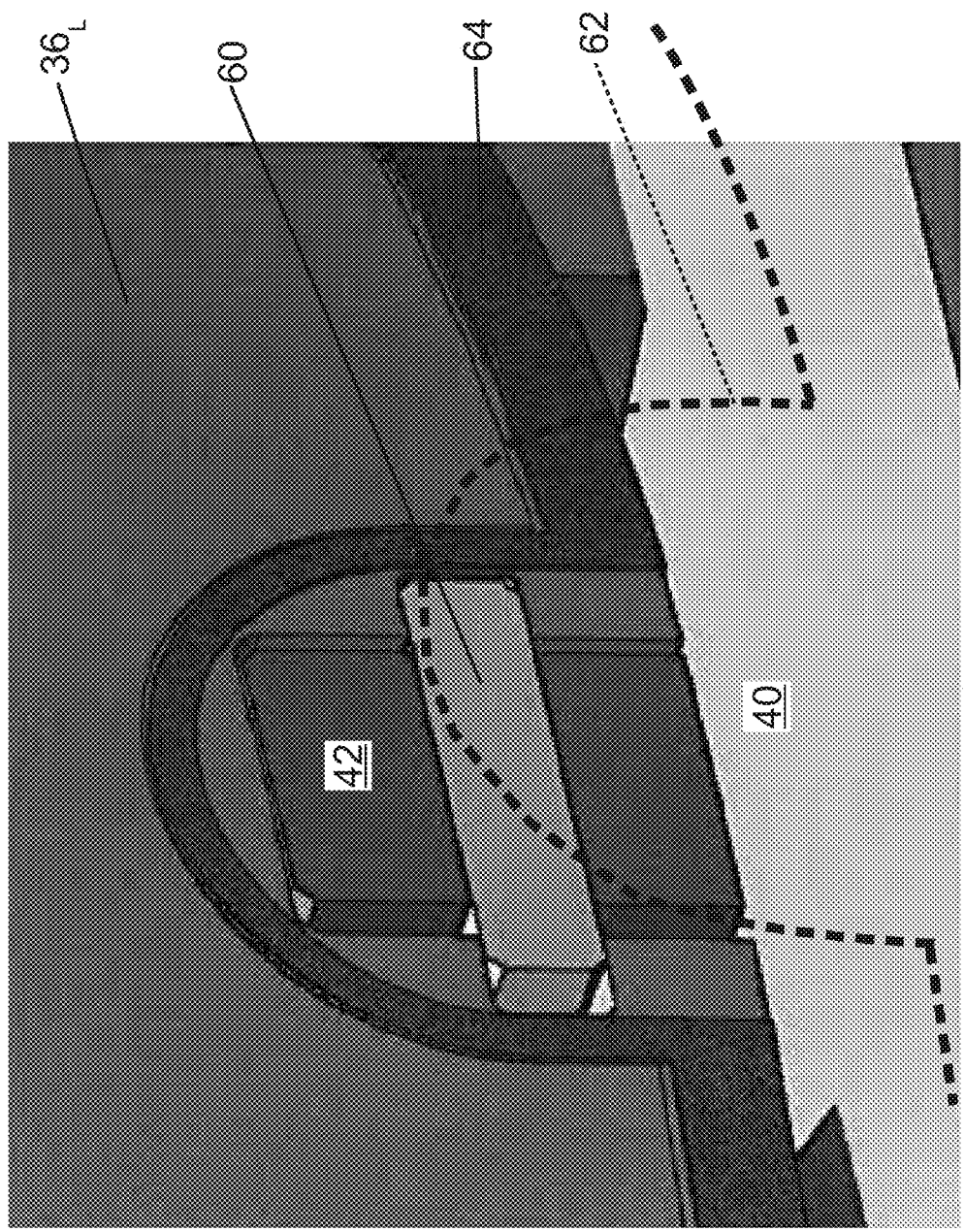
FIG. 6 diagrammatically shows the perspective view of FIG. 5 with the locking block inserted into the lug slot and extending laterally into the notches of the lug cutout so as to tie the lower vessel flange to the support engagement surface via the lug. A seal plate is also shown in phantom.

With reference to FIGS. 5 and 6, as previously mentioned the lugs 42 serve as seismic rotational restraints, and in the illustrative embodiment do not bear the weight of the reactor vessel 14. As seen in FIGS. 5 and 6, the weight of the reactor pressure vessel 10 is borne by the support engagement surfaces 40 as the lower edge of the lower vessel flange 36$_L$ rests on the support engagement surfaces 40. To prevent vertical liftoff of the lower vessel flange 36$_L$ from the support engagement surfaces 40 during a seismic event, the lugs 42 include slots 54 and the lug cutouts 44 include notches 56 aligned horizontally with the lug slots 54. At each support engagement surface 40, a locking block 60 is inserted into the lug slot 54 and extends laterally into the notches 56 in the lug cutout 44 so as to tie the lower vessel flange 36$_L$ to the support engagement surface 40 via the lug 42. This prevents the lower vessel flange 36$_L$ from vertically lifting off of the support engagement surfaces 40 during a seismic event. In this block-in-slots-and-notches arrangement, suitable gaps are provided to accommodate radial displacement due to thermal expansion of the lower vessel flange 36$_L$. Various approaches can be employed to ensure that the shims 50 and locking blocks 60 stay in position. In one approach, which is diagrammatically indicated in FIG. 6, a seal plate 62 (shown in phantom in FIG. 6) is welded to the periphery of the lower vessel flange 36$_L$. FIGS. 3-6 show weld buttering 64 on the lower vessel flange 36$_L$ to facilitate this welding. Thus, the lugs 42 and mating lug cutouts 44, together with the locking blocks 60, define a vertical liftoff prevention assembly that prevents the lower vessel flange 36$_L$ from lifting off the support engagement surfaces 40 during a seismic event.

With returning reference to FIG. 1, the center-of-gravity 34 of the nuclear reactor 10 is located above the plane of the support engagement surfaces 40. As a result, a moment may occur when the nuclear reactor 10 undergoes a seismic event, in that the lateral seismic loading of the nuclear reactor 10 may urge a pendulum motion on the upper and lower regions of the nuclear reactor 10 about the plane of the support engagement surfaces 40.

Figure 7:
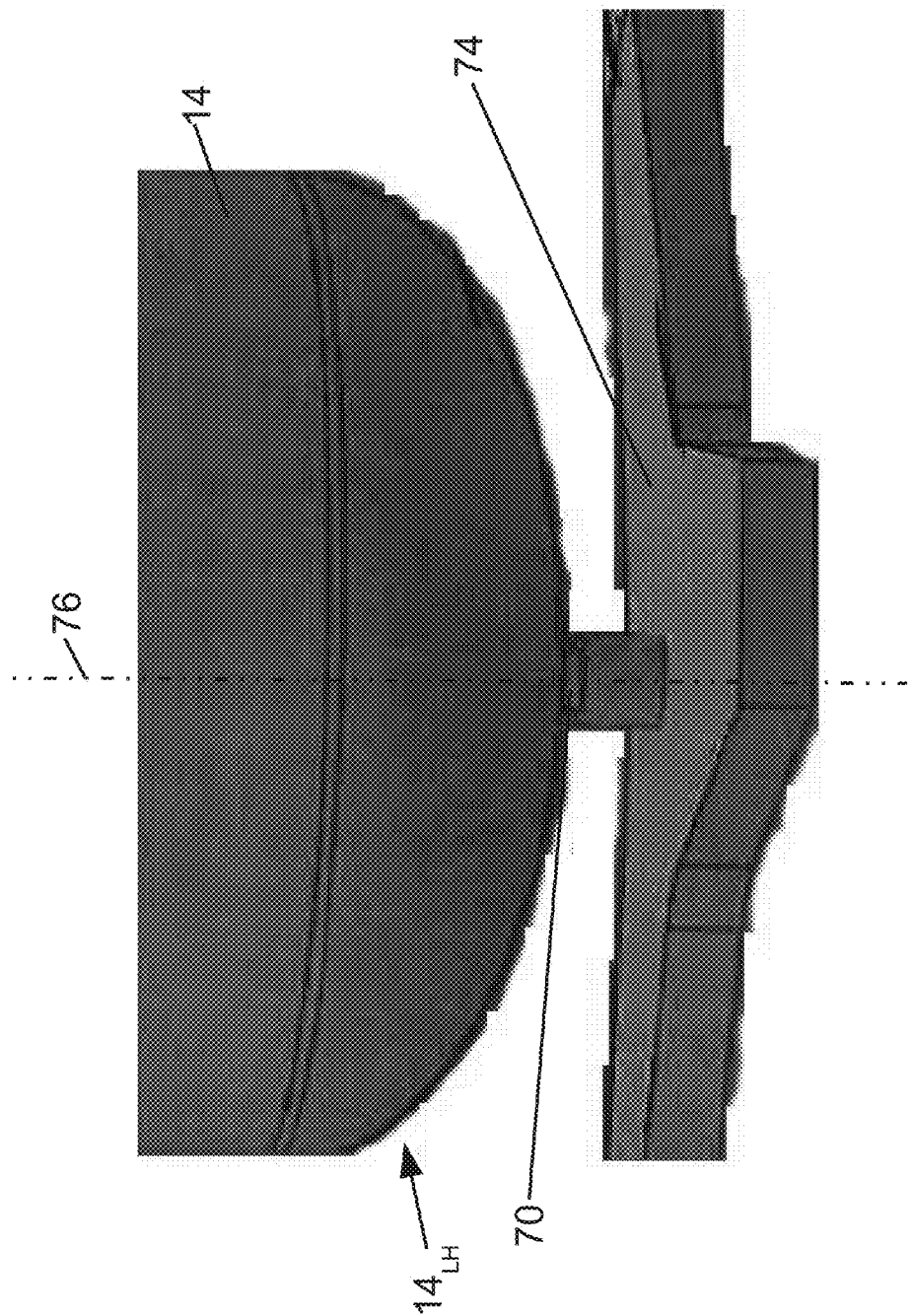
FIG. 7 diagrammatically shows a perspective view of the bottom seismic support including a pin connected to the bottom of the reactor pressure vessel and extending downward into an opening in a support base located at the bottom of the reactor cavity.
Figure 8:
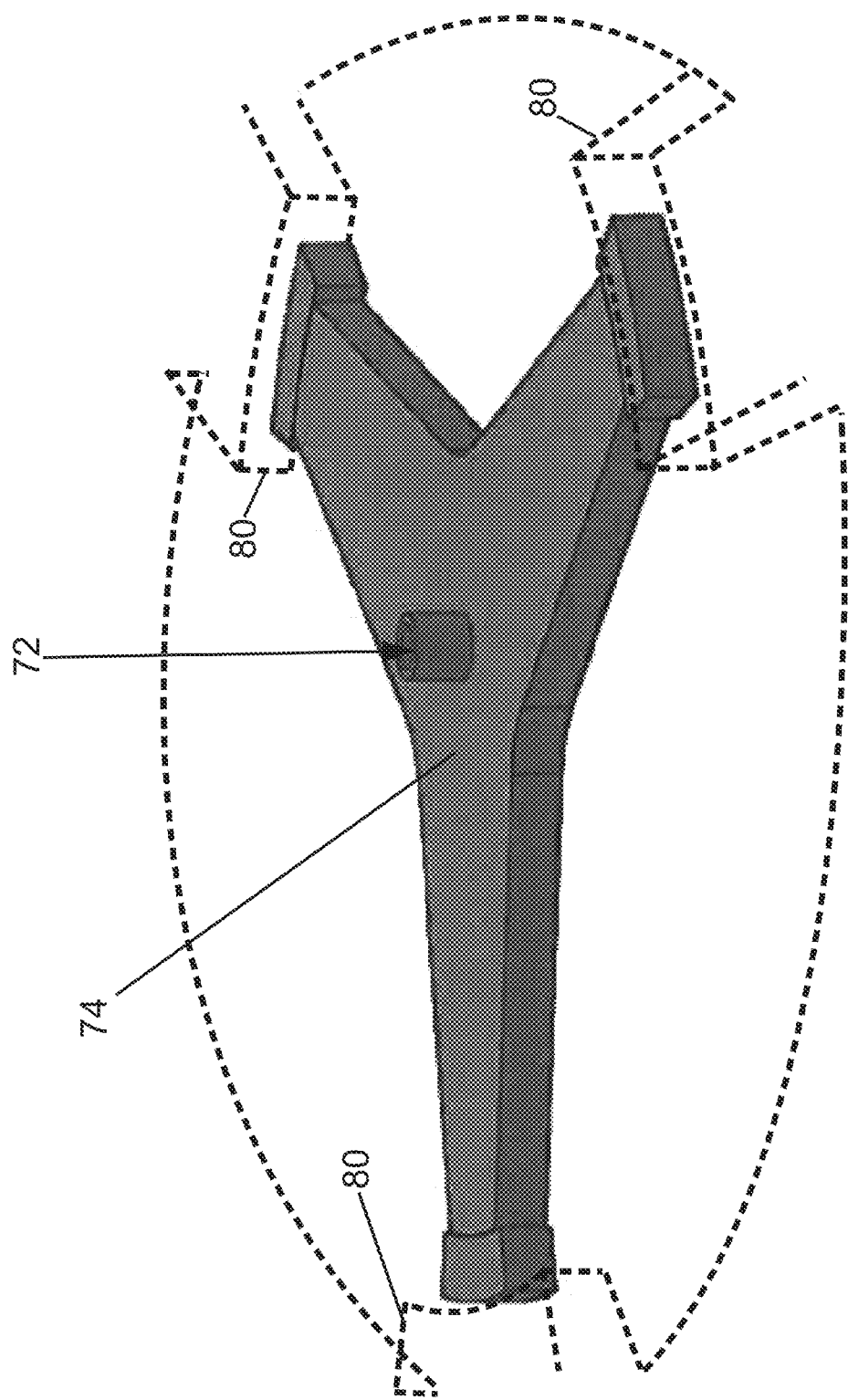
FIG. 8 diagrammatically shows a perspective view of the support base of FIG. 7, along with abutment elements for laterally anchoring the support base on the floor of the reactor cavity.

With continuing reference to FIG. 1 and with further reference to FIGS. 7 and 8, to prevent seismically induced pendulum motion of the reactor pressure vessel 10, a bottom seismic support is provided. In the illustrative embodiment, the bottom seismic support comprises a pin 70 that is connected to the bottom of the reactor pressure vessel 14 (specifically on the lower extremum, that is, bottom, of the lower vessel head 14$_{LH}$ of the reactor pressure vessel 14) and that extends downward and fits into a female pin socket 72 (see FIG. 8) of a support base 74 located at the bottom of the reactor cavity 32, that is, on or in the floor of the civil structure located beneath the nuclear reactor 10. The pin 70 preferably has the shape of a circular cylinder (optionally including a rounded or tapered tip, broadened region at the upper end where it connects with the reactor pressure vessel 14, or so forth). The pin socket 72 of the support base 74 is sized and shaped to receive the pin 70 with lateral tolerances small enough to provide the design-basis lateral seismic restraint. The pin 70 is oriented vertically and is coaxial with the vertical axis of the reactor pressure vessel 14. Said another way, an axis 76 labeled in FIGS. 1 and 7 is both the cylinder axis of the circular cylindrical pin 70 and the vertical axis passing through the center of gravity 34 of the nuclear reactor 10. Said yet another way, the pin 70 defines a pin axis that is coaxial with a cylinder axis of the cylindrical main body of the reactor pressure vessel 14. The pin 70 is located on the centerline of the reactor pressure vessel 14 so that as the vessel 14 thermally grows downward as the reactor 10 heats up as it is brought into operation, the pin 70 moves only vertically downward and stays within the mating pin socket 72. The pin socket 72 should be deep enough that the lower end of the pin 70 does not contact the bottom of the opening of the pin socket 72 for any credible temperature/extent of thermal expansion. The circular pin 70 is located on the reactor axis 76 and is preferably small relative to the diameter of the reactor pressure vessel 14—as a result, radial thermal growth of the pin 70 is minimized. To restrain lateral movement during a seismic event, the circular pin 70 contacts the sidewall of the support base 74 so as to eliminate pendulum motion of the nuclear reactor 10 during a seismic event.

The pin 70 on the bottom of the lower vessel head $14_{LH}$ of the reactor pressure vessel 14 may be fabricated in various ways. In one approach, the pin 70 is a separate element (e.g. forged, cast, machined from square stock, or cut from round steel stock) that is welded to the bottom of the lower vessel head $14_{LH}$ of the reactor pressure vessel 14. In another approach, the pin 70 is fabricated integrally with the lower section of the reactor pressure vessel 14, for example being forged together with the rest of the lower vessel head $14_{LH}$ as a single unitary forging.

The lateral seismic load is transferred from the nuclear reactor 10 to the pin 70 and to the support base 74 which is secured to the civil structure (the floor of the reactor cavity 32 in illustrative FIG. 1). In some contemplated embodiments (not shown), the support base is the floor of the reactor cavity 32 (or other radiological containment floor located underneath the reactor), and the pin socket 72 is suitably a hole drilled into that concrete floor, optionally reinforced by an cylindrical collar of steel or another suitable material (which may optionally extend a distance above the floor). However, this approach has the disadvantage that the hole drilled into the concrete floor can present a pathway for corium ingress into the concrete in the event of an ex vessel core retention event. The opening in such a design is also susceptible to buildup of contaminants that may collect on the floor of the reactor cavity 32, although this can be reduced by employing a steel collar extending above the floor.

With continuing reference to FIGS. 7 and 8, in the illustrative example the support base 74 is separate from the floor of the reactor cavity 32 (or other radiological containment floor located underneath the nuclear reactor) and rests on that floor. The illustrative support base 74 includes three horizontal legs extending away from the pin socket 72, spaced apart circumferentially at 120° intervals around the pin socket 72. Three legs is the minimum needed to provide lateral seismic restraint in any lateral direction; four or more legs are also contemplated. Alternatively the support base may be of another geometry, such as a circular base or a square base.

With particular reference to FIG. 8, lateral motion of the support base 74 on this floor is prevented by suitable abutment elements 80 (shown in phantom in FIG. 8) which are secured to the floor of the reactor cavity 32 (or other radiological containment floor located underneath the nuclear reactor). The abutment elements 80 may, for example, be concrete structures deposited and set on top of the concrete floor, preferably with steel faces engaging the support base. In another embodiment, the abutment elements 80 are a steel structure whose outer circumference coincides with the circumference of the floor of the reactor cavity 32, so that the lateral seismic load is transferred via the abutment elements 80 to the bottom of the sidewall of the reactor cavity 32. Other configurations for integrating or securing the pin socket 72 to the floor of the reactor cavity 32 (or other radiological containment floor located underneath the nuclear reactor) are also contemplated.

Under governing nuclear regulations of some nuclear regulatory jurisdictions, a gap of 1/16-inch or less between the pin 70 and the inner diameter (ID) of the pin socket 72 allows the seismic analysis to consider the interface between the two elements 70, 72 as being in direct contact. Because the radial thermal expansion of the (preferably small-diameter) pin 70 is small, this tolerance is expected to be readily achieved in most designs without the use of shimming. The lateral seismic load that results from the pendulum effect operating on the nuclear reactor 10 is distributed from the pin 70 to the pin socket 72 in the center of the support base 74, to the ends of the legs of the support base 74, to the abutments 80 (or to the walls of the reactor cavity 32 if the base is a plate of diameter commensurate with the reactor cavity diameter, or so forth). The support base 74 is suitably constructed of plate steel or the like of sufficient thickness, and with the legs of sufficient lateral width, to prevent buckling under the lateral loading generated by seismic pendulum movement of the nuclear reactor 10. In view of thermal considerations, it is contemplated for the support base 74 to be supported on the floor of the reactor cavity 32 by footers or the like, so as to define an air gap between the support base 74 and the floor to allow for circulation of the heating ventilating and air conditioning (HVAC) around the support base 74.

It will be appreciated that the bottom seismic support comprising the pin 70 and support base 74 with the mating pin socket 72 advantageously has minimal contact with the bottom of the reactor pressure vessel 14. Thus, the bottom seismic support does not restrict water flooding the reactor cavity 32 during a LOCA response (other unscheduled reactor shutdown scenario) from contacting and immersing the lower portion of the reactor pressure vessel 14 in order to provide core cooling.

The illustrative seismic restraints compensate for both lateral and vertical seismic loads, while accommodating thermal expansion. The seismic restraint system employs a two-point seismic restraint configuration, in which suspension support is provided by the support engagement surfaces 40 and lateral pendulum motion suppression is provided by the pin 70 and mating pin socket 72 along with the support base 74.

The primary vertical bearing support of the nuclear reactor 10 is provided by the bottom surface of the lower vessel flange $36_L$ resting on the support engagement surfaces 40 of the civil structure in the radiological containment. In other contemplated embodiments, the three (relatively narrow) bearing surfaces 40 could be extended to four or more such surfaces, preferably spaced at equal angular intervals around the nuclear reactor (for example, four such surfaces spaced at 90° intervals around the nuclear reactor, five such surfaces spaced at 72° intervals around the nuclear reactor, or so forth), or could be further extended and joined together to form a single annular support surface encompassing the entire lower surface of the lower vessel flange $36_L$ (although this latter design would likely entail adding vent openings and/or other access to the reactor cavity 32 to allow it to be flooded and steam vented). Moreover, the vertical support bearings 40 can support a feature of the pressure vessel other than the illustrative lower vessel flange $36_L$. For example, in a vessel design employing a removable upper vessel head for refueling, in which the flange coupling for opening the vessel is near the top of the pressure vessel (e.g. a flange coupling via which the removable upper vessel head is attached), suitable suspension support may be provided via a ledge formed by a suitable narrowed or constricted diameter portion of the pressure vessel, or may be provided by including protrusions extending from around the middle of the reactor pressure vessel. In embodiments employing protrusions, such protrusions may be integrally included as part of the vessel forging, or welded to the vessel, or attached using a tension band, or so forth.

Liftoff during seismic events is suppressed by the lugs 42 and engaging locking block 60, which allows for construction and installation without exceeding precise location requirements on the interfacing civil structure. Other liftoff prevention configurations are also contemplated. For example, in an alternative embodiment in which the suspension support is via protrusions extending from around the middle of the reactor pressure vessel, such protrusions may include slots and the liftoff prevention mechanism is suitably a bolt passing through the slot and threading into a tapped hole in the support engagement surface 40 (or into a bolt located below a through-hole passing through the support engagement surface in a variant embodiment). In this approach, the bolt head is sized to be too large to pass through the slot, and the bolt is tightened down such that the gap between the top of the protrusion and the bottom of the bolt head is within the required tolerance for seismic restraint. Radial thermal expansion of the reactor pressure vessel can be accommodated in such a design by orienting the slot along the radial direction. The bolt also serves as a seismic rotational restraint assembly due to the engagement between the bolt and the slot preventing rotation of the pressure vessel.

The lower point of the two-point seismic restraint configuration comprises the illustrative pin 70 and pin socket 72. Optionally, the male and female aspects of the illustrative pin 70 and pin socket 72 assembly may be reversed—that is, a pin may be anchored to the floor of the reactor cavity (or other floor of the civil structure located beneath the nuclear reactor) and a pin socket may be formed as a hole in the bottom of the reactor pressure vessel lower head.

While illustrative embodiments have been described herein, it is to be appreciated that more generally the seismic restraint for the nuclear reactor 10 includes (i) a suspension support on which the nuclear reactor is supported (for example, the support engagement surfaces 40), the suspension support anchored to a civil structure of a radiological containment containing the nuclear reactor (anchored to the reactor cavity 32 of the radiological containment 24 in the illustrative examples) and defining a reactor support plane (the plane of the support engagement surfaces 40 in the illustrative examples) located above the bottom of the nuclear reactor 10 and below the center of gravity 34 of the nuclear reactor and (ii) a lateral seismic support engaging the nuclear reactor at a plane or point located below the reactor support plane (for example, the pin 70 and associated features 72, 74), the lateral seismic support configured to prevent pendulum motion of the nuclear reactor.

The pin 70 and socket 72 restraint advantageously leave space free around the bottom of the lower head $14_{LH}$ of the reactor pressure vessel 14. In some embodiments, this space is utilized to accommodate an in-vessel reactor core retention cooling system as further disclosed herein. The in-vessel reactor core retention cooling system provides external cooling of the lower head $14_{LH}$ of the reactor pressure vessel 14 during a LOCA or other event in operation that compromises operation of the reactor cooling system (RCS, including the coolant water in the reactor pressure vessel 14 and associated components such as reactor coolant pumps).

Figure 9:
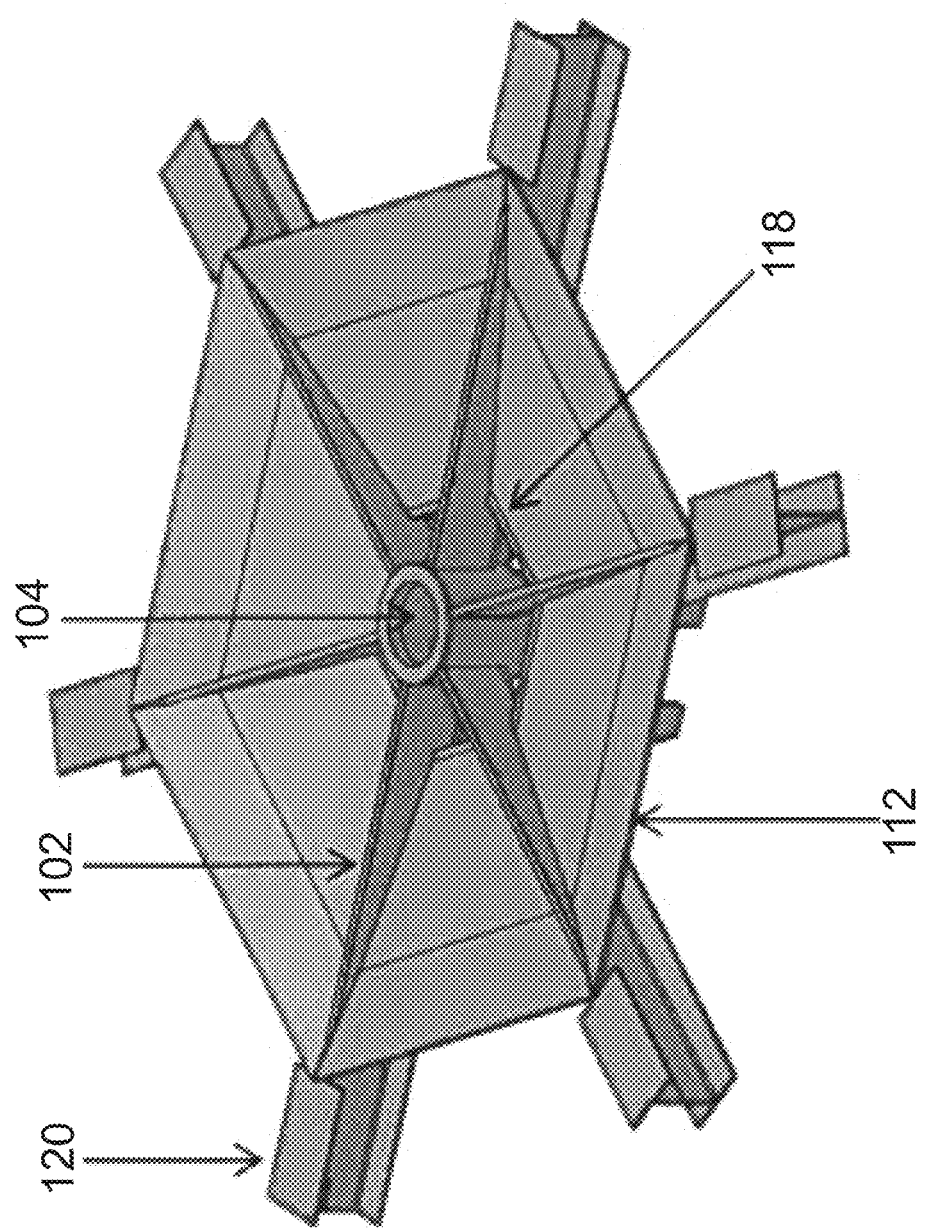
FIG. 9 diagrammatically shows a perspective view of another embodiment of the base support, which includes six radial support beams and intervening flow baffles to provide in-vessel reactor core retention cooling.
Figure 10:
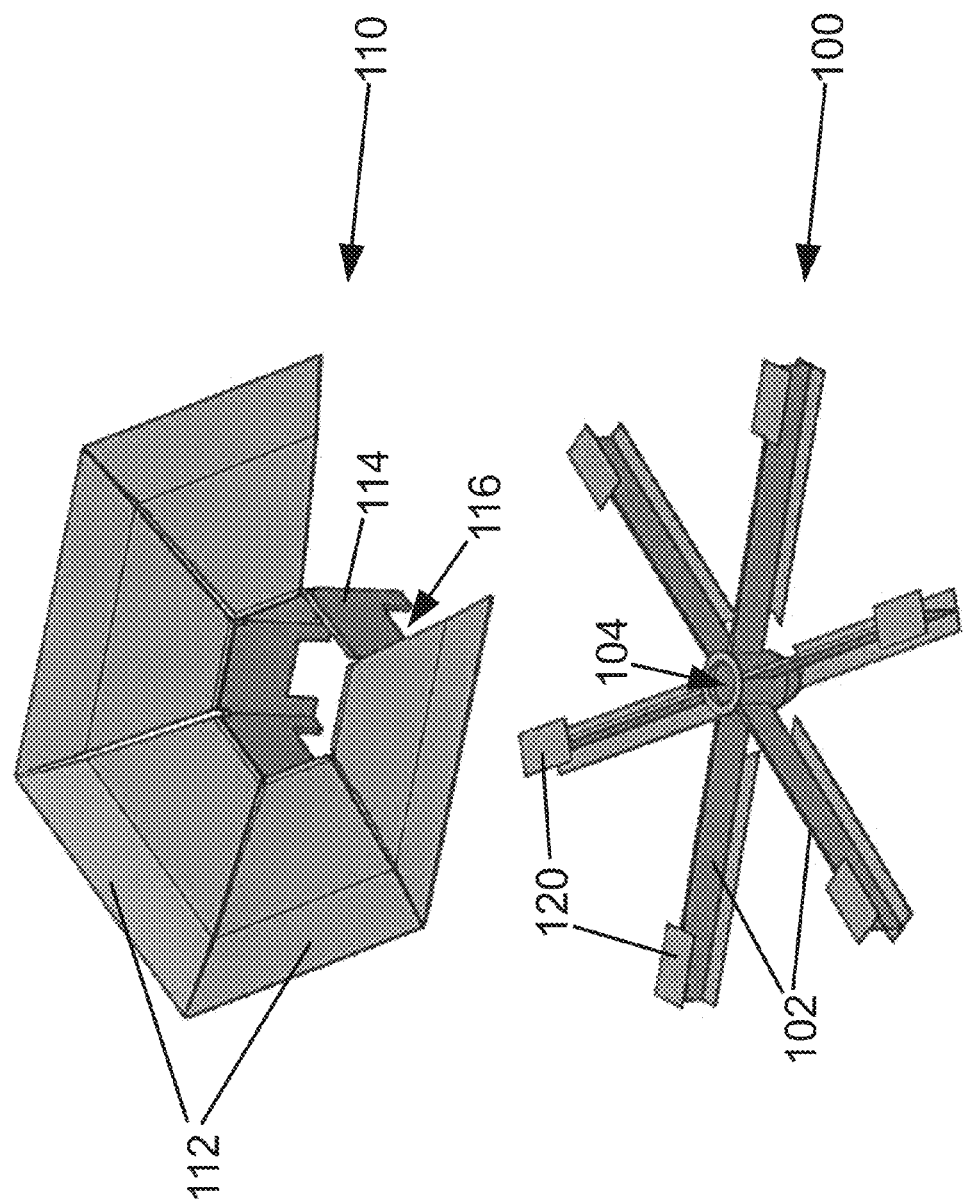
FIG. 10 diagrammatically shows an exploded perspective view of the base support of FIG. 9.

With reference to FIGS. 9 and 10 show assembled and exploded views, respectively, of one embodiment that includes an in-vessel reactor core retention cooling system. The embodiment of FIGS. 9 and 10 includes an illustrative support base 100 corresponding to the previously describes support base 74 and comprising (in the illustrative example of FIGS. 9 and 10) six radial beams 102 extending radially outward from a central pin socket 104 that corresponds to the pin socket 72 of the previously described support base 74. Ends of the radial beams 102 abut walls of the reactor cavity 32, or abutment elements 80 (shown in phantom in FIG. 8), so as to laterally immobilize the support base 100 to enable it to provide lateral seismic restraint for the pin 70. An in-vessel reactor core retention cooling system 110 includes flow baffles 112 (one of which is omitted in the exploded view of FIG. 10 to reveal internal features) and a mating base 114 that mates with the support base 100 as shown in the assembled view of FIG. 9. As seen in FIG. 10, the mating base 114 includes inlet slots 116, which together with flow openings 118 defined between the central pin socket 104 and the flow baffles 112 in the assembled structure provides a water intake flow path. The illustrative radial beams 102 include support pads 120 at their outboard ends for additional baffling that extends upward to extend insulation and/or the in-vessel reactor core retention cooling structure vertically along the sidewalls of the pressure vessel 14 (feature not shown in FIGS. 9 and 10, but see the cylindrical jacket 172 of the embodiment of FIGS. 15-18).

The in-vessel reactor core retention cooling system 110 allows water flow around the lower vessel including at least the lower vessel head $14_{LH}$ when the reactor cavity is flooded. The baffles 112 preferably include thermal insulation material, for example being constructed as steel plates or sheets coated on one or both sides by a thermally reflective metal (e.g. stainless steel) multi-foil. The baffles 112 are configured to be in close proximity to (that is, approximately conformal with) the lower vessel outer wall so as to define a plenum between the baffles 112 and the lower vessel wall. Water flowing in this plenum cools the vessel during a LOCA or other event in order to cool the nuclear reactor core 12 within the pressure vessel 14 in order to prevent melting or to cool the melted core mass ("corium") inside the pressure vessel so as to prevent or delay relocation of the corium to the floor of the reactor cavity 32. In the event of a severe LOCA that results in coolant loss exposing the reactor core 12 to air, this approach potentially allows long-term exposure of the molten core to the air inside of the reactor vessel allowing release of additional fission products to the containment atmosphere.

The structure of FIGS. 9 and 10 provides seismic support for the reactor vessel 14 in any radial direction via the engagement of the pin 70 in the pin socket 104, and provides an inlet for cooling water in support of in-vessel core retention in the event of a LOCA or the like, and optionally also provides thermal insulation to the lower vessel head $14_{LH}$ during normal reactor operation (for example by constructing the baffles 112 to include a thermally reflective multi-foil). The support base 100 is a freestanding assembly supported by the floor of the reactor cavity 32. The flow baffles 112 located between the beams 102 of the support base 100 direct cooling water along the lower head $14_{LH}$ of the pressure vessel 14 during in-vessel core cooling operation. An optional insulation cassette (not shown) of thermally insulating material may optionally be added which surrounds the flow baffling 112 and support beams 102, or additionally or alternatively insulation may be integrally added into these components, for example by including a thermally reflective multi-layer foil. During reactor core cooling operation, the gap or plenum between the lower reactor vessel head $14_{LH}$ and the flow baffling 112 contains cooling water which enters via the inlet slots 116 and flow openings 118 at the center of the structure and travels upward around the reactor vessel shell through the gap or plenum defined by the flow baffling 112 located around the radial support beams 102. The flow baffles 112 are designed to optimize coolant flow during reactor core cooling by conforming to the shape of the lower reactor vessel head $14_{LH}$. Near the center of the seismic support structure, the flow baffling 112 extends downward approximately to the elevation of the floor of the reactor cavity 32, and cutouts defining the inlet slots 116 are provided through the flow baffling at the base of the structure. Advantageously, the water flows around and immerses the pin socket 104, providing effective cooling of this thermal conductance pathway.

Flow area for reactor core cooling operation through the center portion of the structure is maximized by reducing the amount of material perpendicular to the direction of flow while maintaining stiffness in the radial direction by the structural beams 102. In addition, the cutouts 116 for flow ingress are located away from the walls of the reactor pressure vessel 14 to limit flow turbulence and promote natural circulation and heat transfer characteristics of the in-vessel reactor core retention cooling system. Space is provided between the flow inlets 116 and the lower reactor vessel head $14_{LH}$ to reduce undesirable flow eddies and to streamline the flow characteristics. Optional insulation included with the baffles 112 limits heat loss from the lower vessel head $14_{LH}$ during normal operation.

In the illustrative embodiment of FIGS. 9 and 10, the support base 100 and the in-vessel reactor core retention cooling system 110 are constructed as separate elements that are fitted together (see exploded view of FIG. 10 and assembled view of FIG. 9). This approach accommodates thermal stresses; however, it is alternatively contemplated to construct these components integrally, for example by welding each baffle to its two bounding support beams. As another contemplated configuration, the baffles 112 may be constructed as a single-piece frustoconical element having its smaller opening accommodating the pin socket 104 and its overall frustoconical shape being conformal with the lower vessel head $14_{LH}$.

With reference to FIGS. 11-17, another embodiment of the support base that includes an in-vessel reactor core retention cooling system is described. In this embodiment a support base 150 is constructed as a socket plate 152 with polygonal outer perimeter, namely a hexagonal outer perimeter in the illustrative example. The socket plate 152 includes a pin socket 154 at its center, supported by reinforcing ribs 156 in the illustrative example. The socket plate 152, pin socket 154, and reinforcing ribs 156 form a unitary component that may be variously constructed, for example as a single cast forging, or as components that are welded together, e.g. the socket plate 152 and ribs 156 being cut from stainless steel plate stock, the pin socket 154 being cut from hollow cylindrical stainless steel stock, and these components being welded together to form a unitary component. The socket plate 152 inserts inside a retaining ring plate 158 having an inside perimeter that comports with the outer perimeter of the socket plate 152. The socket plate 152 and the ring plate 158 are disposed on a base plate 160 with the ring plate 158 welded or otherwise secured with the base plate 160 and the socket plate 152 being placed onto the base plate 160 inside the ring plate 158 without welding or other bonding.

Figure 12:
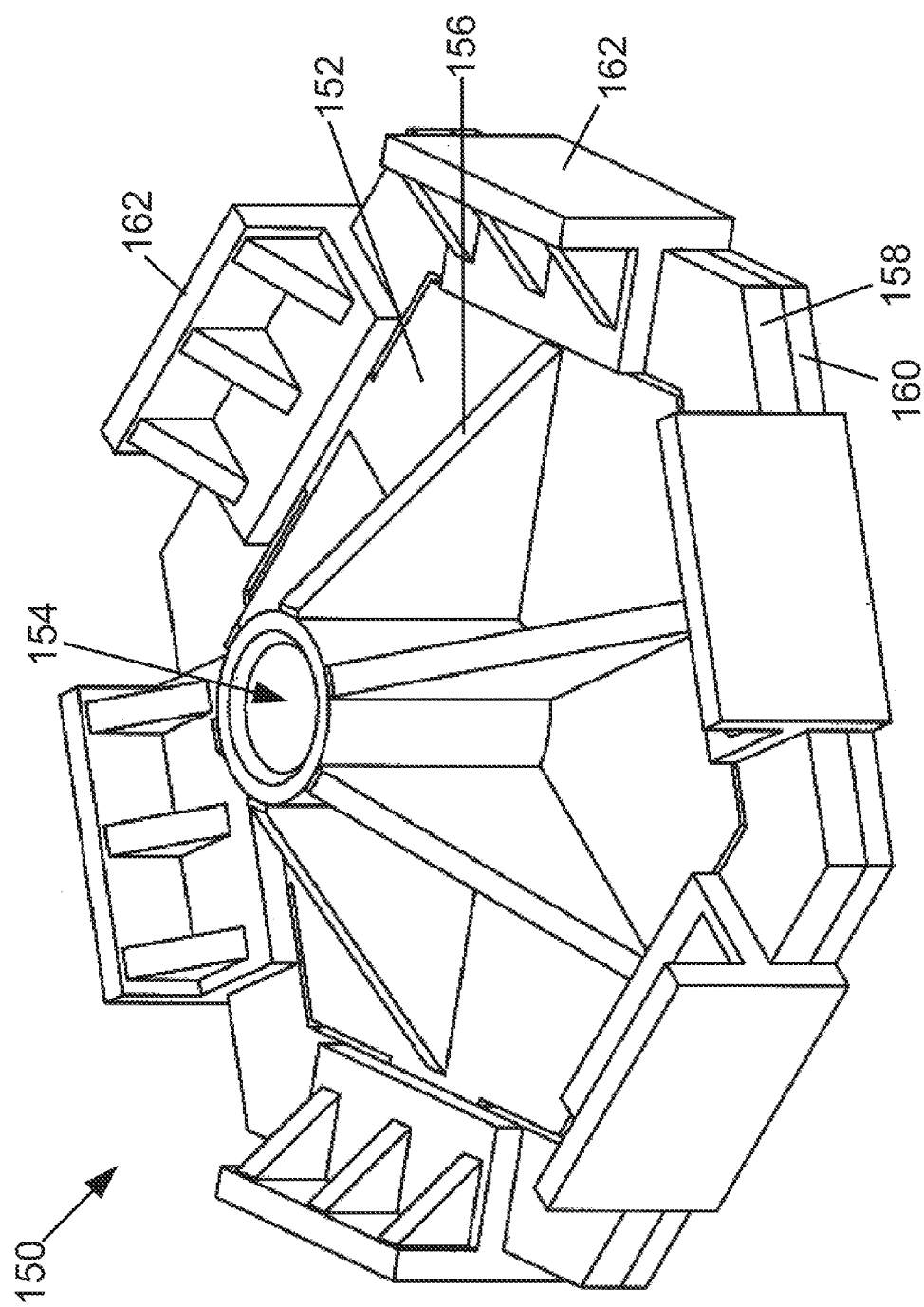
FIG. 12 diagrammatically shows a perspective view of the base support of FIG. 11 along with abutment elements for laterally anchoring the support base on the floor of the reactor cavity.
Figure 13:
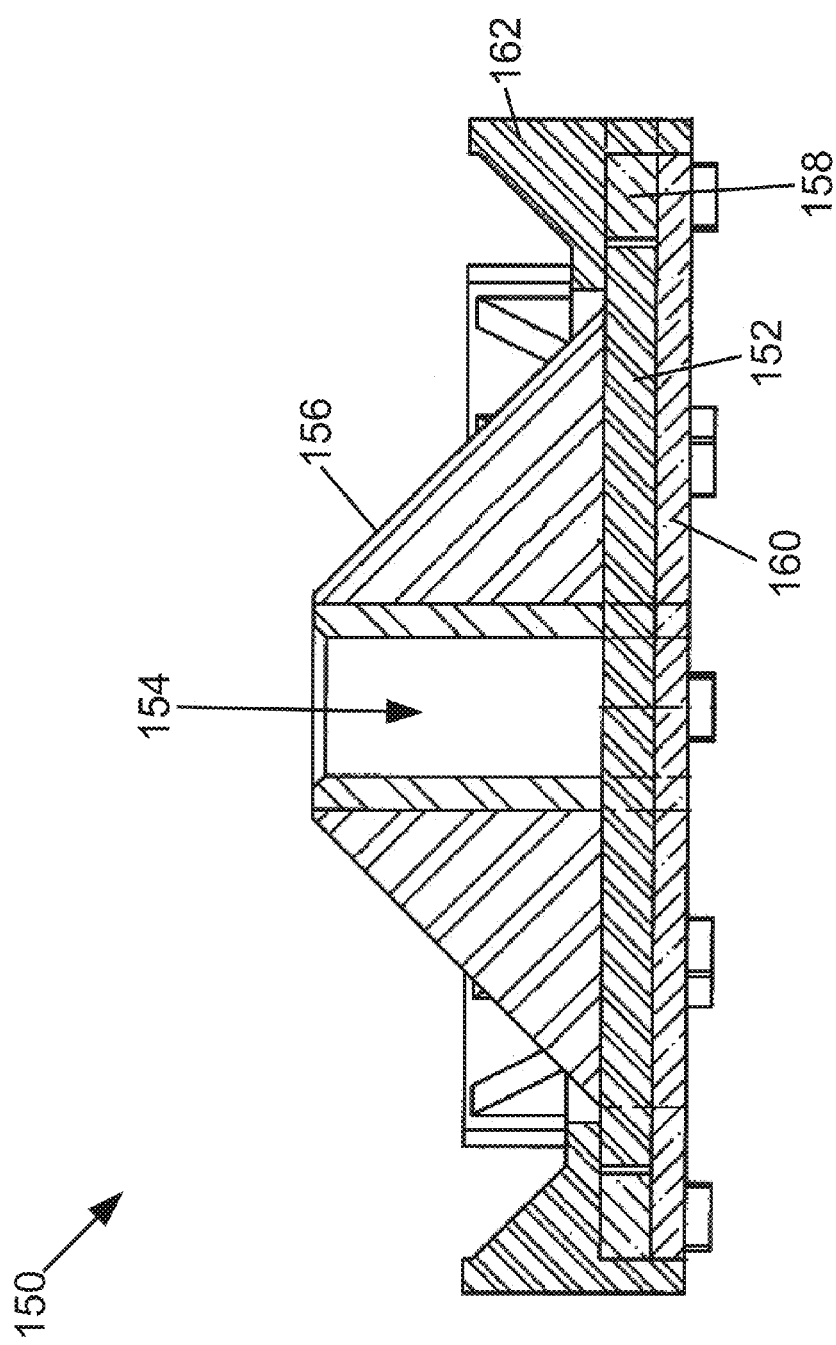
FIG. 13 diagrammatically shows a side sectional view of the base support and abutment elements of FIG. 12.

With particular reference to FIGS. 12 and 13, the support base 150 further includes buttress elements 162 that serve the same function as the ends of the horizontal legs of the support base 74 of FIG. 8, that is, to engage walls of the reactor cavity 32, abutment elements 80 (shown in phantom in FIG. 8), or other features which are built into or otherwise secured to the floor of the reactor cavity 32 (or other radiological containment floor located underneath the nuclear reactor) so as to laterally immobilize the support base 150 to enable it to provide lateral seismic restraint for the pin 70. In an alternative approach, the buttress elements 162 are omitted and the outer perimeter of the base plate 160 and/or the outer perimeter of the ring plate 158 directly engage abutment elements of the floor.

Figure 11:
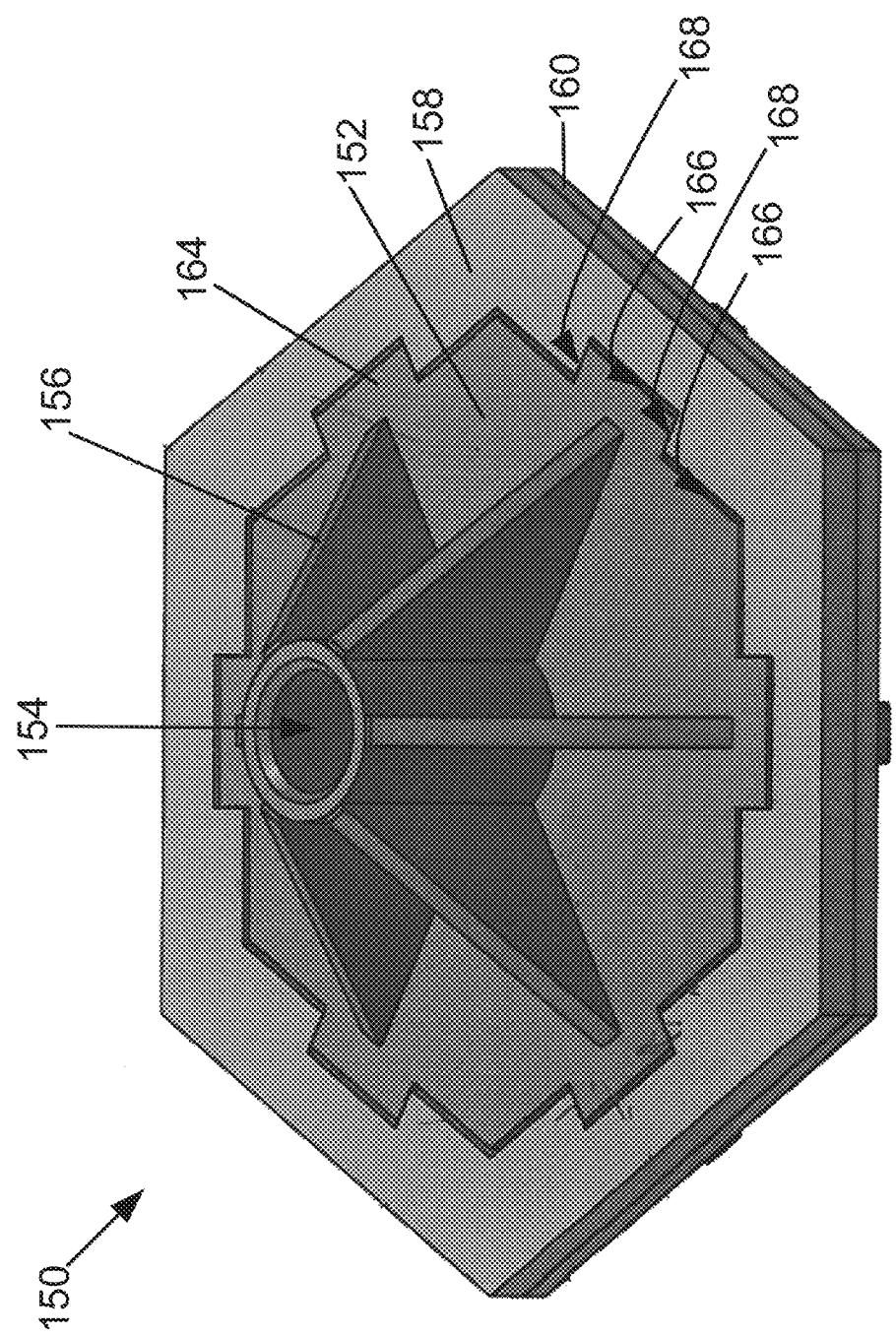
FIG. 11 diagrammatically shows a perspective view of another embodiment of the base support with in-vessel reactor core retention cooling features.

The perspective view of the support base 150 shown in FIG. 11 omits the buttress elements 162, so as to reveal tabs 164 extending from the sides of the hexagonal (or more generally polygonal) perimeter of the socket plate 152. These tabs 164 mate into corresponding recesses in the inside perimeter of the ring plate 158, as best seen in FIG. 11. Seismic support for the reactor vessel 14 in any radial direction is provided by the pin 70 inserted in the pin socket 154, with lateral forces transferred to the socket plate 152, then to the ring plate 158, and then to the base plate 160 and/or buttress elements 162. The tabs 164 advantageously accommodate thermal expansion as follows. Gaps 166 in the radial direction between the outer perimeter of the socket plate 152 (including the tabs 164) and the inner perimeter of the ring plate 158 are sufficiently large to accommodate the larger thermal expansion of the socket plate 152 as compared with the ring plate 158. Larger thermal expansion of the socket plate 152 as compared with ring plate 158 results from the socket plate 152 being in closer proximity to the lower reactor pressure vessel head $14_{LH}$. There is also a conductive thermal pathway from the head 14LH via the pin/socket coupling 70, 154. On the other hand, gaps 168 in the lateral direction (that is, transverse to the radial direction, i.e. on the sides of the tabs 164) are smaller, and the interfaces between the socket plate 152 and the ring plate 158 at these gaps 168 provides the seismic restraint. Thermal expansion of the tabs 164 in the lateral direction is reduced because of the small lateral extent of the tabs 164 and their large distance from the hottest center point of the socket plate 152. For seismic restraint to be provided in any radial direction, at least three tabs (suitably spaced 120° apart in this case) should be provided—in the illustrative example there are six tabs 164 spaced 60° apart. In the illustrative embodiment (see FIG. 12), the buttress elements 162 cover the tabs 164, which provides the side benefit of preventing lift-off of the unbonded socket plate 152 from the base plate 160 during a seismic event. Toward this end, the buttress elements 162 may optionally be welded to the ring plate 158 and/or to the base plate 160 (but not welded to the socket plate 152 which should be free to move and thermally expand laterally except to the extent it is restrained by the ring plate 158).

Figure 14:
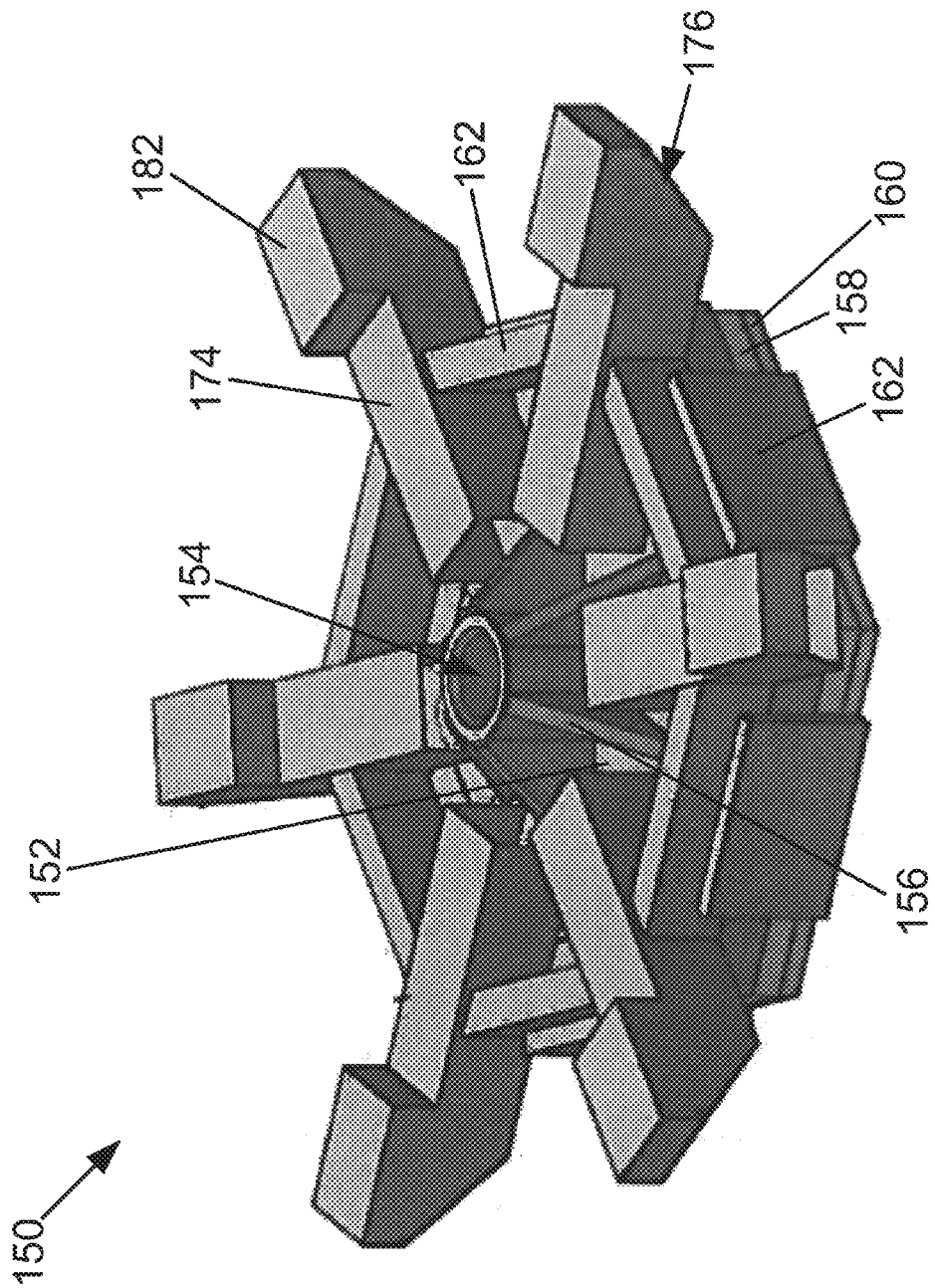
FIG. 14 diagrammatically shows a perspective view of the base support and abutment elements of FIGS. 11-13, along with flow inlet ducts of an illustrative in-vessel core retention cooling system.

With reference to FIGS. 14-17, the support base 150 is shown in combination with an in-vessel reactor core retention cooling system 170 that allows water flow around the lower vessel including at least the lower vessel head 14$_{LH}$ when the reactor cavity is flooded. The in-vessel reactor core retention cooling system 170 includes a cylindrical jacket 172 that surrounds the lower portion of the pressure vessel 14 including at least the lower vessel head 14$_{LH}$. The cylindrical jacket 172 narrows toward the pin 70 attached to the bottom of the lower vessel head 14$_{LH}$ in approximate conformity with the shape of the lower vessel head 14$_{LH}$. Ducts 174 are disposed on the support base 150 between the buttress elements 162. The ducts 174 are best seen in FIG. 14 which shows a perspective view of the support base 150 including the ducts 174. As seen in FIG. 14, the buttress elements 162 on either side of a duct 174 define a socket or channel into which the duct 174 fits. Water flows into the ducts 174 via duct inlets 176, through the ducts 174 to the center of the support base 150 (or, more precisely, into a plenum defined between the lower vessel head 14$_{LH}$ and the support base 150) and then flows upward through a cylindrical plenum 178 defined between the outside surface of the pressure vessel 14 and the inside surface of the cylindrical jacket 172. Accordingly, the cylindrical jacket 172 functions as a cylindrical baffle disposed around the lower portion of the pressure vessel 14. The water flow path inward through the ducts 174 and then upward through the cylindrical plenum 178 is diagrammatically indicated in FIG. 17 as flow path F. Optionally, a float valve 180 is provided at the duct inlet 176 (shown only in FIG. 17 in the depicted left-side duct 174) to prevent debris from entering the duct 176 during normal operation of the nuclear reactor. The float valve 180 is configured to open as water fills the reactor cavity 32, or as water pressure is applied to the duct inlet 176. The illustrative float valve 180 comprises a metal-encapsulated foam swing door disposed at the duct inlet 176, which swings upward and inward when lifted by a rising water level or applied water pressure. In the illustrative embodiment, the cylindrical jacket 172 is supported by support surfaces 182 built into the outboard ends of the ducts 176 (see FIG. 14); however, the cylindrical jacket 172 may additionally or alternatively be supported by a direct connection to the support base 150 (or, said another way, the support surfaces 182 may instead be built into the support base). As another contemplated approach, the cylindrical jacket 172 may be mounted in suspension, for example being suspended from the rim of the reactor cavity 32. It is also contemplated to include discrete spacers (not shown) of a suitably thermally insulating material disposed in the plenum 178 between the pressure vessel 14 and the cylindrical jacket 172 to more precisely define the gap of the plenum 178.

During an in-vessel reactor core cooling operation, for example in response to a LOCA, the reactor cavity 32 (see FIG. 1) is flooded, for example using water drained from the illustrative refueling water storage tank (RWST) 28 located inside radiological containment 24. This water enters the duct inlets 176 and flows into the center of the support base 150 (or, more precisely, into a plenum defined between the lower vessel head 14$_{LH}$ and the support base 150) and upward into the cylindrical plenum 178 defined between the reactor pressure vessel 14 and the cylindrical jacket 172. In this operation, the cylindrical jacket 172 thus serves as a cylindrical baffle. The water, being in close proximity to the lower vessel head 14$_{LH}$ which is hot due to heat transferred from the reactor core 12 to the vessel head 14$_{LH}$, heats the water to convert it to steam which rises through the cylindrical plenum 178 so as to drive the flow F (see FIG. 17) by natural circulation driven by the heat generated by the reactor core 12. (This heat is typically residual decay heat in an in-vessel reactor core cooling scenario, since in a LOCA response the nuclear chain reaction is swiftly terminated by releasing control rods in an operation known as "scram"). By using baffling to confine water flow to the plenum 178 which is in close conformity with the reactor pressure vessel 14, more efficient cooling is achieved versus the situation in which the reactor cavity 32 is flooded but without the plenum 178 defined by the baffling 172. Additionally, if the available water is insufficient to flood the reactor cavity 32 to a level at or above the top elevation of the reactor core 12, then the core retention cooling system 170 provides a passive (that is, natural circulation-driven) mechanism for drawing water from the reactor cavity 32 upward along the exterior surface of the lower portion of the reactor pressure vessel 14 to provide core cooling.

Although not shown in the illustrative drawings, it is contemplated to provide additional features to inject water into the duct inlets 176 and/or to direct steam exiting from the top of the cylindrical plenum 178. For example, in some embodiments a manifold is provided to direct water drained from the RWST 28 into the duct inlets 176 (rather than doing so indirectly by flooding the reactor cavity 32). Additionally or alternatively, in some embodiments a steam manifold is provided at the top of the cylindrical jacket 172 that collects steam from the plenum 178 and pipes it to a desired location, for example sparging it into the RWST 28.

During normal operation, the in-vessel reactor core retention cooling system 170 and/or the support base 150 optionally provide thermal insulation for the lower portion of the reactor pressure vessel 14. This can be accomplished, for example, by including infrared-reflective metal multi-foils in these components, and/or by including other type(s) of thermal insulation such as ceramic insulation material.

Moreover, in some embodiments it is contemplated to provide the thermal insulation functionality without the in-vessel reactor core retention cooling functionality. In the embodiments of FIGS. 10-17, for example, this entails omitting the ducts 174 and modifying the cylindrical jacket 172 to reduce or eliminate the cylindrical plenum 178. In some such embodiments, the cylindrical jacket may be in direct contact with the lower portion of the reactor pressure vessel, and may be bottom-supported by support surfaces built into the support base and/or supported by attachment of the cylindrical jacket to the reactor pressure vessel. In such an embodiment, the use of the pin 70 and pin socket 154 to provide lateral support provides numerous benefits as described herein, including accommodating vertical thermal expansion of the pressure vessel, providing symmetric lateral support in all directions, and leaving most of the space between the lower vessel head 14$_{LH}$ and the floor of the reactor cavity 32 available for other uses such as accommodating thermal insulation that jackets the lower portion of the reactor pressure vessel 14 including the lower vessel head 14$_{LH}$.

As another contemplated embodiment, the floor connection extending between the bottom of a lower vessel head of the reactor pressure vessel and the floor underneath the nuclear reactor can take a form other than the illustrative pin 70 and pin socket 72, 104, 154. For example, the configuration can be reversed, so that the pin is attached to the floor and the pin socket is attached to the bottom of the lower vessel head. As another example, the floor connection can be (at least partially) weight-bearing to (at least help) support the nuclear reactor.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

We claim:

1. A nuclear island comprising:
 a nuclear reactor including a nuclear reactor core comprising fissile material disposed in a reactor pressure vessel;
 a vertically oriented pin attached to the bottom of a lower vessel head of the reactor pressure vessel;
 a pin socket disposed on a floor underneath the nuclear reactor and receiving the vertically oriented pin so that lateral motion of the lower vessel head is restrained;
 a support base including the pin socket and one or more peripheral surfaces, the support base being disposed on the floor underneath the nuclear reactor;
 one or more abutment elements secured to the floor underneath the nuclear reactor, wherein one or more of the peripheral surfaces of the support base engage the one or more abutment elements secured to the floor underneath the nuclear reactor to laterally restrain the support base; and
 thermal insulation jacketing the lower portion of the reactor pressure vessel including the lower vessel head.

2. The nuclear island of claim 1 wherein the vertically oriented pin defines a vertical axis that intersects the center of gravity of the nuclear reactor.

3. The nuclear island of claim 2 wherein the vertically oriented pin comprises a circular cylindrical pin.

4. The nuclear island of claim 1 wherein the abutment elements comprise walls of a reactor cavity that contains a lower portion of the nuclear reactor including at least the nuclear reactor core and the lower vessel head.

5. The nuclear island of claim 1 wherein the support base includes radial beams extending radially outward from the pin socket and the one or more peripheral surfaces of the support base that engage the one or more abutment elements secured to the floor underneath the nuclear reactor comprise outboard ends of the radial beams.

6. The nuclear island of claim 1 wherein the support base includes a socket plate on which the pin socket is attached, and the one or more peripheral surfaces of the support base that engage the one or more abutment elements secured to the floor underneath the nuclear reactor comprises an outer perimeter of the socket plate.

7. The nuclear island of claim 6 wherein the one or more abutment elements secured to the floor underneath the nuclear reactor comprises a retaining ring plate secured to the floor underneath the nuclear reactor and having an inside perimeter that comports with the outer perimeter of the socket plate.

8. The nuclear island of claim 1 wherein the thermal insulation jacketing the lower portion of the reactor pressure vessel including the lower vessel head comprises:
 a cylindrical jacket comprising thermal insulation that surrounds the lower portion of the pressure vessel including the lower vessel head, wherein the cylindrical jacket narrows toward the vertically oriented pin attached to the bottom of the lower vessel head of the reactor pressure vessel.

9. The nuclear island of claim 8 wherein a cylindrical plenum is defined between the outside surface of the reactor pressure vessel and the inside surface of the cylindrical jacket, the cylindrical plenum having a lower inlet defined by the narrowing of the cylindrical jacket toward the vertically oriented pin attached to the bottom of the lower vessel head of the reactor pressure vessel.

10. The nuclear island of claim 9 further comprising ducts configured to admit water into the lower inlet of the cylindrical plenum.

11. The nuclear island of claim 1 wherein the thermal insulation comprises a thermally reflective metal multi-foil.

* * * * *